US008004177B2

(12) United States Patent
Lee et al.

(10) Patent No.: US 8,004,177 B2
(45) Date of Patent: Aug. 23, 2011

(54) CONDUCTING POLYMER COMPOSITION AND ELECTRONIC DEVICE INCLUDING LAYER OBTAINED USING THE CONDUCTING POLYMER COMPOSITION

(75) Inventors: Tae-Woo Lee, Seoul (KR); Jong-Jin Park, Guri-si (KR); Yi-Yeol Lyu, Yongin-si (KR); Lyong-Sun Pu, Suwon-si (KR); Sang-Yeol Kim, Gwacheon-si (KR); Mu-Gyeom Kim, Hwaseong-si (KR); Eun-Sil Han, Yongin-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1076 days.

(21) Appl. No.: 11/517,480

(22) Filed: Sep. 8, 2006

(65) Prior Publication Data
US 2007/0112133 A1 May 17, 2007

(30) Foreign Application Priority Data
Nov. 14, 2005 (KR) .................. 10-2005-0108523

(51) Int. Cl.
*H01J 63/04* (2006.01)

(52) U.S. Cl. .................. 313/504; 257/40; 257/E51.027; 257/E51.029; 257/E51.031; 257/E51.034; 313/505; 252/301.35; 428/450; 428/462; 524/262; 524/265; 524/267; 525/474

(58) Field of Classification Search .................. None
See application file for complete search history.

(56) References Cited

U.S. PATENT DOCUMENTS

| 4,356,429 | A | 10/1982 | Tang |
| 4,672,265 | A | 6/1987 | Eguchi et al. |
| 5,645,948 | A | 7/1997 | Shi et al. |
| 5,728,801 | A | 3/1998 | Wu et al. |
| 5,821,309 | A * | 10/1998 | Oka .............. 525/540 |
| 5,834,100 | A | 11/1998 | Marks et al. |
| 6,201,051 | B1 | 3/2001 | Mager et al. |
| 6,214,937 | B1 | 4/2001 | Kennedy et al. |
| 6,281,285 | B1 | 8/2001 | Becker et al. |
| 6,307,083 | B1 | 10/2001 | Igarashi |
| 6,517,958 | B1 | 2/2003 | Sellinger et al. |
| 6,605,373 | B2 | 8/2003 | Woo et al. |
| 6,616,863 | B1 * | 9/2003 | Angelopoulos et al. ...... 252/500 |
| 6,660,410 | B2 | 12/2003 | Hosokawa |
| 6,830,830 | B2 | 12/2004 | Hsieh et al. |
| 6,897,473 | B1 | 5/2005 | Burroughes et al. |
| 6,900,285 | B2 | 5/2005 | Woo et al. |
| 2002/0149025 | A1 | 10/2002 | Andriessen et al. |
| 2003/0120099 | A1 | 6/2003 | Laine et al. |
| 2003/0204038 | A1 | 10/2003 | Xiao et al. |
| 2003/0211358 | A1 | 11/2003 | Kitano et al. |
| 2004/0024164 | A1 | 2/2004 | Lyu et al. |
| 2005/0035346 | A1 | 2/2005 | Bazan et al. |
| 2005/0123760 | A1 | 6/2005 | Cammack et al. |
| 2005/0142381 | A1 | 6/2005 | Lyu et al. |
| 2005/0212406 | A1 | 9/2005 | Daniels et al. |
| 2007/0045619 | A1 | 3/2007 | Park et al. |
| 2007/0048532 | A1 | 3/2007 | Lyu et al. |
| 2007/0138483 | A1 | 6/2007 | Lee et al. |
| 2008/0135809 | A1 * | 6/2008 | Hsu .................. 252/500 |

FOREIGN PATENT DOCUMENTS

| JP | 1996-509760 A | 10/1996 |
| JP | 10-251518 A | 9/1998 |
| JP | 11-003781 | 1/1999 |
| JP | 11-329734 | 11/1999 |
| JP | 2000-215987 | * 8/2000 |
| JP | 2001-506797 A | 5/2001 |

(Continued)

OTHER PUBLICATIONS

Translation of JP 2000-215987 into English.* Kuwabara et al., "Thermally Stable Multilayered Organic Electroluminescent Devices Using Novel Starburst Molecules, 4,4',4"-Tri(N-carbazolyl)triphenylamine (TCTA) and 4,4',4"-Tri(3-methylphenylphenyl-amino)triphenylamine (m-MTDATA), as Hole-Transport Materials", Adv. Mater. 1994, 6, No. 9, pp. 677-679.
Müller et al. *Acta Cryst.* 2003, E59, o1838-o1839. Date of on-line publication; Oct. 31, 2003.
Lin, W.-J., et al. "Synthesis and Optoelectronic Properties of Starlike Polyflourenes with a Silsesquioxane Core." *Macromolecules*, vol. 37 (2004): pp. 2335-2341.

(Continued)

*Primary Examiner* — Marc S Zimmer
(74) *Attorney, Agent, or Firm* — Robert E. Bushnell, Esq.

(57) ABSTRACT

Provided are a conducting polymer composition and an electronic device including a layer formed using the conducting polymer composition. The conducting polymer composition contains: at least one compound selected from the group consisting of a siloxane compound of formula (1) below, a siloxane compound of formula (2) below, and a silane compound of formula (3) below; and a conducting polymer:

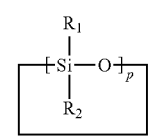

(1)

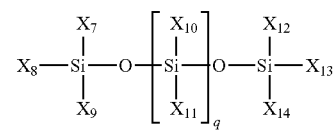

(2)

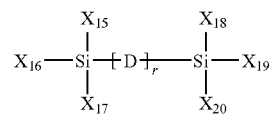

(3)

where $R_1$, $R_2$, $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, $X_{20}$, D, p, m, q, and r are the same as described in the detailed description of the invention. The electronic device including a layer formed using the conducting polymer composition has excellent electroluminescent characteristics and long lifetime.

24 Claims, 2 Drawing Sheets

FOREIGN PATENT DOCUMENTS

| | | | |
|---|---|---|---|
| JP | 2003-119255 A | | 4/2003 |
| JP | 2004-220931 | | 8/2004 |
| JP | 2006-108458 | | 4/2006 |
| KR | 1020030097658 | | 12/2003 |
| KR | 1020040056662 | | 7/2004 |
| KR | 2004-0070561 | | 8/2004 |
| KR | 1020050032691 | | 4/2005 |
| KR | 1020050056001 | | 6/2005 |
| KR | 1020050077367 | | 8/2005 |
| WO | WO 95/01871 | * | 1/1995 |
| WO | WO 00/65653 | | 11/2000 |
| WO | 20041094501 A2 | | 11/2004 |
| WO | 20051060624 A2 | | 7/2005 |

OTHER PUBLICATIONS

He, C., et al. "Highly Efficient Luninescent Organic Clusters with Quantum Dot-Like Properties." *J. Am. Chem. Soc.*, vol 126(2004): pp. 7792-7793.

Kalinowski, J., et al. "Injection-Controlled Electroluminescence in Organic Light-Emitting Diodes Based on Molecularly-Doped Polymers: II. Double-Layer Devices." *J. Phys. D: Appl.Phys.*, vol. 34 (2001): pp. 2282-2295.

Rinaldi, A.W., et al. "Elecrical, Spectroscopic, and Thermal Properties of Blends Formed by PEDOT, PVC, and PEO." *J. Appl. Poly. Sci.*, vol. 96 (2005); 1710-1715.

Brick, C.M., et al. "Robust Polyaromatic Octasilsesquioxanes from Polybromophenylsilsesquioxanes, BrxOPS, via Suzuki Coupling." *Macromolecules*, vol. 38 (2005): pp. 4661-4665.

Ghosh, S., et al. "Supramolecular Self-Assembly for Enhanced Conductivity in Conjugated Polymer Blend: Ionic Crosslinking in Blends of Poly(3,4-ethylenedioxythiophene)-Poly(styrenesulfonate) and Poly(vinylpyrrolidone)." Adv. Mater., vol. 10, No. 14 (1998): pp. 1097-1099.

Machine translation of JP 2004-220931 published on Aug. 5, 2004.

Machine translation of JP 11-003781 issued on Jan. 6, 1999.

Machine translation of JP 2006-108458 published on Apr. 20, 2006.

Office action from Chinese Patent Office issued in Applicant's corresponding Chinese Patent Application No. 200610153694.8 dated Apr. 28, 2010 and Request for Entry of the Accompanying Office Action for Chinese Office action attached herewith.

Japanese Office Action issued by Japanese Patent Office on Jun. 29, 2010 corresponding Korean Patent Application No. 10-2005-0108523 and Request for Entry of the Accompanying Office Action attached herewith.

Chinese Office Action issued on Jul. 30, 2010 and Request for Entry of the Accompanying Office Action herewith.

Chinese Office Action issued on Jul. 30, 2010 and Request for Entry of the Accompanying Office Action herewith.

* cited by examiner

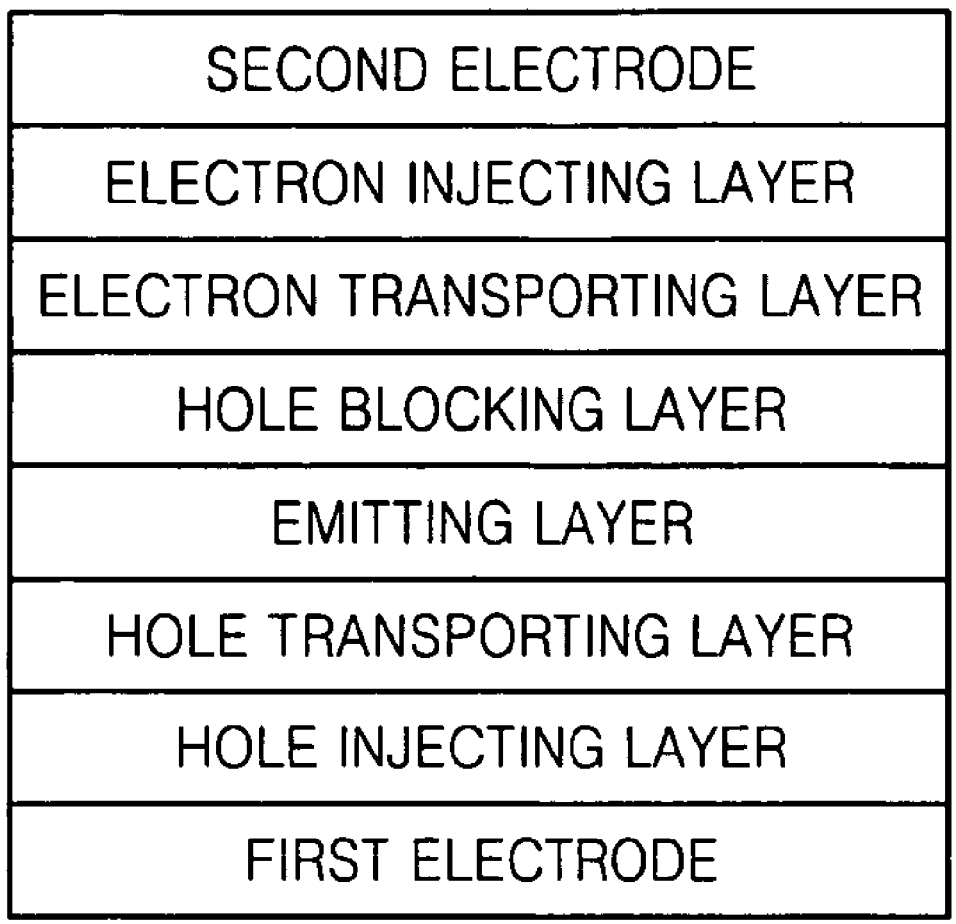

CONDUCTING POLYMER COMPOSITION AND ELECTRONIC DEVICE INCLUDING LAYER OBTAINED USING THE CONDUCTING POLYMER COMPOSITION

CROSS-REFERENCE TO RELATED PATENT APPLICATIONS AND CLAIM OF PRIORITY

This application claims the benefit of Korean Patent Application No. 10-2005-0108523, filed on Nov. 14, 2005, in the Korean Intellectual Property Office, the disclosure of which is incorporated herein in its entirety by reference. Furthermore, the present application is related to two co-pending U.S. applications: 1) Ser. No. 11/480,876, entitled CONDUCTING POLYMER COMPOSITION AND ELECTRONIC DEVICE INCLUDING LAYER OBTAINED USING THE CONDUCTING POLYMER COMPOSITION based upon Korean Patent Application Serial No. 10-2005-0125455 filed in the Korean Intellectual Property Office on 19 Dec. 2005, and filed in the U.S. Patent & Trademark Office on 6 Jul. 2006: and 2) Ser. No. 11/448,142, entitled ORGANOSILOXANE COMPOUND AND ORGANIC LIGHT-EMITTING DEVICE COMPRISING THE SAME based upon Korean Patent Application Serial No. 10-2005-0078720 filed in the Korean Intellectual Property Office on 26 Aug. 2005, and filed in the U.S. Patent & Trademark Office on 7 Jun. 2006.

BACKGROUND OF THE INVENTION

1. Field of the Invention

The present invention relates to a conducting polymer composition and an electronic device including a layer obtained using the conducting polymer composition, and more particularly, to a conducting polymer composition containing at least one of a siloxane compound and a silane compound and a conducting polymer, and an electronic device including a layer obtained using the conducting polymer composition.

2. Description of the Related Art

Intensive research into various next generation electronic devices including, for example, light-emitting devices, photovoltaic devices, electrochromic devices, electrophoretic devices, organic thin film transistors, organic memory devices, etc. has been conducted.

Among the above-listed electronic devices, light emitting diodes, which are self-emissive devices, have the advantages of a large viewing angle, a high contrast, and a short response time. Light emitting diodes can be classified into inorganic light emitting diodes using an inorganic compound in their emitting layer and organic light emitting diodes (OLEDs) using an organic compound in their emitting layer. OLEDs have higher brightness, lower driving voltage, and shorter response time than inorganic light emitting diodes and can achieve full color display. Due to these advantages of OLEDs, much research into OLEDs has been performed.

OLEDs have a stacked structure including an anode, an organic light emitting layer, and a cathode. OLEDs can have various structures including, for example, a stack of an anode, a hole injecting layer, a hole transporting layer, an emitting layer, an electron transporting layer, an electron injecting layer, and a cathode, a stack of an anode, a hole injecting layer, a hole transporting layer, an emitting layer, a hole blocking layer, an electron transporting layer, an electron injecting layer, and a cathode, etc.

WO 00/65653 discloses an organic thin film semiconductor device including a Cu electrode, a layer formed of PEDOT-PSS (poly (3,4-ethylene dioxy thiophene)-poly(4-styrenesulfonate)), an emitting layer, and a cathode.

However, since PSS in PEDOT-PSS is highly hygroscopic and can absorb about 25% of moisture in the air, the layer formed of PEDOT-PSS may contain moisture. In addition, byproducts, such as a catalyst used in the synthesis of PEDOT-PSS, metal ions (Na ions, etc.), sulfate, etc. may exist in the layer formed of PEDOT-PSS. The byproducts can produce sulfate in the layer of PEDOT-PSS by reacting with electrons. When the anode underlying the layer formed of PEDOT-PSS is formed of ITO or IZO, the anode are etched due to the strong acidity (pH of about 1.8) of PEDOT-PSS, thereby resulting in impurities, such as indium (In), tin (S), zinc (Zn), oxygen (O), etc., in the layer of PEDOT-PSS. In other words, the layer formed of PEDOT-PSS may contain impurities and moisture for the above-described reasons. Accordingly, when such impurities and moisture diffuse into the emitting layer, the light emitting efficiency and lifetime of the device deteriorate. Therefore, an improvement regarding these problems is required.

SUMMARY OF THE INVENTION

The present invention provides a conducting polymer composition containing at least one of a siloxane compound and a silane compound and a conducting polymer, and an electronic device including a layer obtained using the conducting polymer composition.

According to an aspect of the present invention, there is provided a conducting polymer composition including: a conducting polymer and at least one compound selected from the group consisting of a siloxane compound of formula (1), a siloxane compound of formula (2), and a silane compound of formula (3):

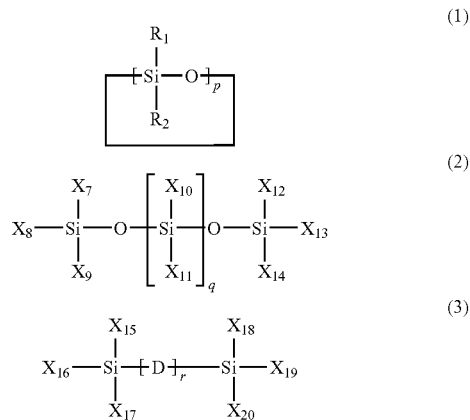

where each of $R_1$ and $R_2$ is independently selected from the group consisting of —$CH_2(CH_2)_m SiX_1 X_2 X_3$, —O—$SiX_4 X_5 X_6$, a cross-linkable unit, a hole transport unit, an electron transport unit, an emissive unit, hydrogen, a halogen atom, a $C_1$-$C_{20}$ alkyl group, and a $C_6$-$C_{30}$ aryl group, and at least one of $R_1$ and $R_2$ is —$CH_2(CH_2)_m SiX_1 X_2 X_3$, —O—$SiX_4 X_5 X_6$, or a cross-linkable unit;
each of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, and $X_{20}$ is independently selected from the group consisting of a cross-linkable unit, a hole transport unit, an electron transport unit, an emissive unit, hydrogen, and a $C_1$-$C_{20}$ alkyl group, and at least one of $X_1$, $X_2$, and $X_3$, at least one of $X_4$, $X_5$, and $X_6$, at least one of $X_7$, $X_8$, $X_9$, $X_{10}$, $X_{11}$, $X_{12}$, $X_{13}$, and $X_{14}$, and at least one of $X_{15}$, $X_{16}$, $X_{17}$, $X_{18}$, $X_{19}$, and $X_{20}$ are a cross-linkable unit;

D is a $C_1$-$C_{20}$ alkylene group, a $C_1$-$C_{20}$ alkylene group substituted with at least one halogen atom, a $C_1$-$C_{20}$ alkylene group substituted with at least one hole transport unit, electron transport unit or emissive unit, or a divalent hole transport unit;

p is an integer from 3 to 8;

m is an integer from 1 to 10;

q is zero or an integer from 1 to 10;

r is zero or an integer from 1 to 10;

q $X_{10}$ are the same or different;

q $X_1$ are the same or different; and r D are the same or different.

According to another aspect of the present invention, there is provided a conducting polymer composition, including: a conducting polymer; and at least one compound selected from the group consisting of siloxane compounds of formulae (1a), (1b), (1c), (1d), (1e), (1f), (1g), (2a), (2b), (2c) and (2d) and silane compounds of formulae (3a), (3b), (3c), and (3d):

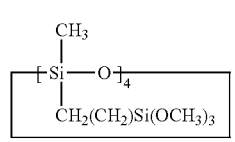
(1a)

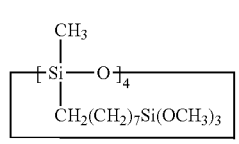
(1b)

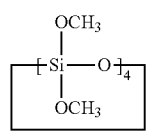
(1c)

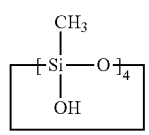
(1d)

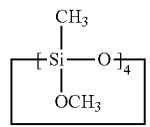
(1e)

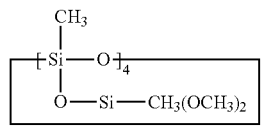
(1f)

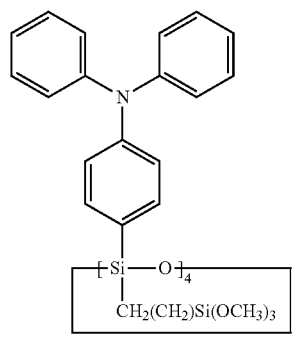
(1g)

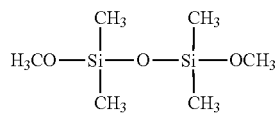
(2a)

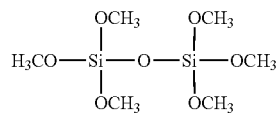
(2b)

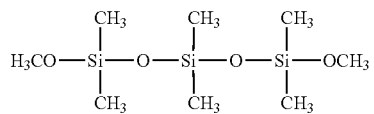
(2c)

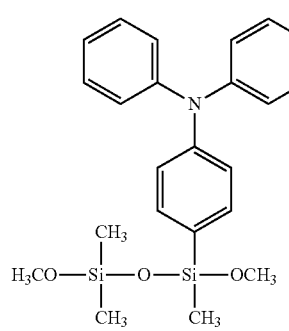
(2d)

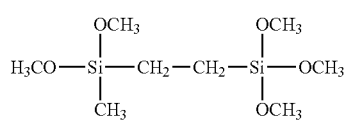
(3a)

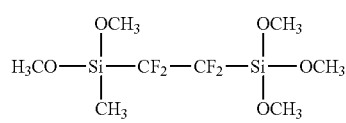
(3b)

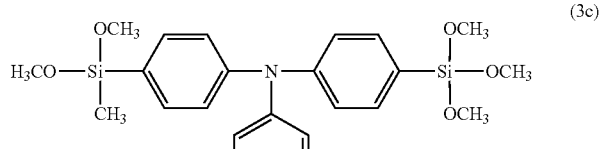
(3c)

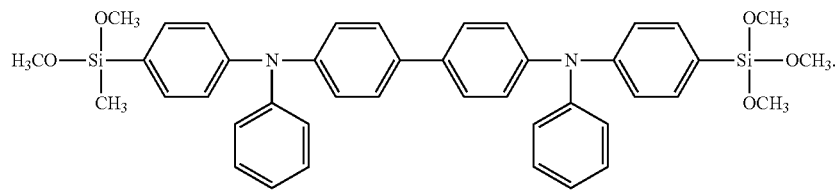
(3d)

It is preferred that the at least one compound and the conducting polymer are contained in a weight ratio of 0.01:99.9-20:80.

According to another aspect of the present invention, there is provided an electronic device including a layer obtained using the above-described conducting polymer composition.

According to yet another aspect of the present invention, there is provided an organic light-emitting device, including: a first electrode; a second electrode; an emitting layer interposed between the first electrode and the second electrode; and at least one of a hole transporting layer and a hole injecting layer interposed between the emitting layer and the first electrode, said at least one of the hole transporting layer and the hole injecting layer obtained from a conducting polymer composition, the conducting polymer composition, including: a conducting polymer; and at least one compound selected from the group consisting of a siloxane compound of formula (1), a siloxane compound of formula (2), and a silane compound of formula (3):

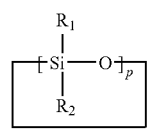
(1)

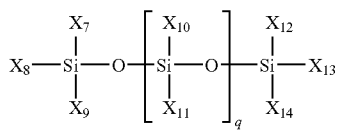
(2)

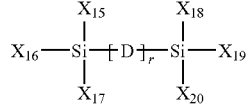
(3)

where each of $R_1$ and $R_2$ is independently selected from the group consisting of —$CH_2(CH_2)_m SiX_1X_2X_3$, —O—$SiX_4X_5X_6$, a cross-linkable unit, a hole transport unit, an electron transport unit, an emissive unit, hydrogen, a halogen atom, a $C_1$-$C_{20}$ alkyl group, and a $C_6$-$C_{30}$ aryl group, and at least one of $R_1$ and $R_2$ is —$CH_2(CH_2)_m SiX_1X_2X_3$, —O—$SiX_4X_5X_6$, or a cross-linkable unit; each of $X_1$, $X_2$, $X_3$, $X_4$, $X_5$, $X_6$, $X_7$, $X_8$, $X_9$, $X_{10}$, $X_{11}$, $X_{12}$, $X_{17}$, $X_{18}$, $X_{19}$, and $X_{20}$ is independently selected from the group consisting of a cross-linkable unit, a hole transport unit, an electron transport unit, an emissive unit, hydrogen, and a $C_1$-$C_{20}$ alkyl group, at least one of $X_1$, $X_2$, and $X_3$, at least one of $X_4$, $X_5$, and $X_6$, at least one of $X_7$, $X_8$, $X_9$, $X_{10}$, $X_{11}$, $X_{12}$, $X_{13}$, and $X_{14}$, and at least one of $X_{15}$, $X_{16}$, $X_{17}$, $X_{18}$, $X_{19}$, and $X_{20}$ are a cross-linkable unit;

D is a $C_1$-$C_{20}$ alkylene group, a $C_1$-$C_{20}$ alkylene group substituted with at least one halogen atom, a $C_1$-$C_{20}$ alkylene group substituted with at least one hole transport unit, electron transport unit or emissive unit, or a divalent hole transport unit;

p is an integer from 3 to 8;
m is an integer from 1 to 10;
q is zero or an integer from 1 to 10;
r is zero or an integer from 1 to 10;
q $X_{10}$ are the same or different;
q $X_{11}$ are the same or different; and
r D are the same or different.

Since the conducting polymer composition contains a siloxane compound and/or a silane compound, in addition to the conducting polymer, the siloxane and silane compounds forming a network of conducting polymer chains and having strong adhesion to an electrode material, such as ITO or IZO, the electronic device including the layer obtained using the conducting polymer composition has excellent electrical and optoelectronic characteristics and long device lifetime.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein:

FIGS. 1A through 1C illustrate structures of organic light-emitting devices as electronic devices according to embodiments of the present invention.

DETAILED DESCRIPTION OF THE INVENTION

Figure 1A:
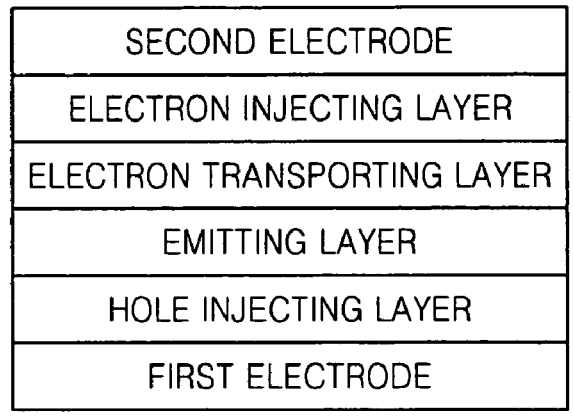

Hereinafter, embodiments of the present invention will be described in detail

A conducting polymer composition according to an embodiment of the present invention includes at least one of a siloxane compound and a silane compound, and a conducting polymer. With the siloxane compound and the silane compound, a network of conducting polymer chains may be formed. Therefore, the mobility of the conducting polymer chains in the layer formed of the conducting polymer composition is restricted, thereby preventing migration of various impurities (for example, impurities originating from an anode) and moisture to other layers. In addition, the siloxane or silane materials have strong adhesion to various electrode materials, such as ITO, IZO etc. Therefore, the electrical and optoelectronic characteristics and lifetime of an electronic device including a layer obtained using the conducting polymer composition can be improved.

In particular, a conducting polymer composition according to an embodiment of the present invention includes at least one of a siloxane compound of formula (1) below, a siloxane compound of formula (2) below, and a silane compound of formula (3) below, and a conducting polymer:

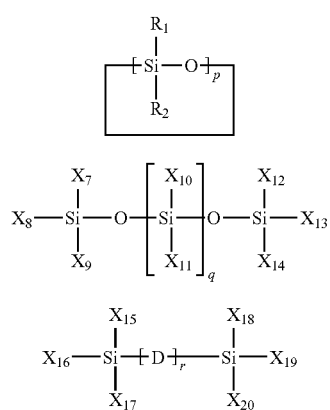

In formulae (1) through (3), each of $R_1$ and $R_2$ can be independently $-CH_2(CH_2)_mSiX_1X_2X_3$, $-O-SiX_4X_5X_6$, a cross-linkable unit, a hole transport unit, an electron transport unit, an emissive unit, hydrogen, a halogen atom, a $C_1$-$C_{20}$ alkyl group (preferably, a $C_1$-$C_{10}$ alkyl group), or a $C_6$-$C_{30}$ aryl group, preferably, a $C_6$-$C_{15}$ aryl group. Here, at least one of $R_1$ and $R_2$ is $-CH_2(CH_2)_mSiX_1X_2X_3$, $-O-SiX_4X_5X_6$, or a cross-linkable unit.

In formulae (1) through (3), each of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, and $X_{20}$ is independently a cross-linkable unit, a hole transport unit, an electron transport unit, an emissive unit, hydrogen, or a $C_1$-$C_{20}$ alkyl group (preferably, a $C_1$-$C_{10}$ alkyl group). Here, at least one of $X_1$, $X_2$, and $X_3$, at least one of $X_4$, $X_5$, and $X_6$, at least one of $X_7$, $X_8$, $X_9$, $X_{10}$, $X_{11}$, $X_{12}$, $X_{13}$, and $X_{14}$, and at least one of $X_{15}$, $X_{16}$, $X_{17}$, $X_{18}$, $X_{19}$, and $X_{20}$ are a cross-linkable unit.

In other words, the siloxane compound of formula (1), the siloxane compound of formula (2), and the silane compound of formula (3) should contain at least one cross-linkable unit so that a network of conductive polymer chains can be effectively formed In formula (3), D can be a $C_1$-$C_{20}$ alkylene group (preferably, a $C_1$-$C_{10}$ alkylene group), a $C_1$-$C_{20}$ alkylene group substituted with at least one halogen atom (preferably, a $C_1$-$C_{10}$ alkylene group substituted with at least one halogen atom), a $C_1$-$C_{20}$ alkylene group substituted with at least one hole transport unit, electron transport unit, or emissive unit (preferably, a $C_1$-$C_{10}$ alkylene group substituted with at least one hole transport unit, electron transport unit, or emissive unit), or a divalent hole transport unit. The terms "divalent hole transport unit" used in connection with formula (3) means that D in formula (3) is a divalent group.

In formulae (1) through (3), p can be an integer from 3 to 8; m can be an integer from 1 to 10; q can be 0 or an integer from 1 to 10; and r can be 0 or an integer from 1 to 10.

In formulae (1) through (3), q $X_{10}$ can be the same or different; q $X_{11}$ can be the same or different; and r D can be the same or different.

In formulae (1) through (3), the cross-linkable unit can be a hydroxyl group, a $C_1$-$C_{20}$ alkoxy group, or a halogen atom, but is not limited thereto.

In formulae (1) through (3), the hole transport unit can be, but is not limited to,

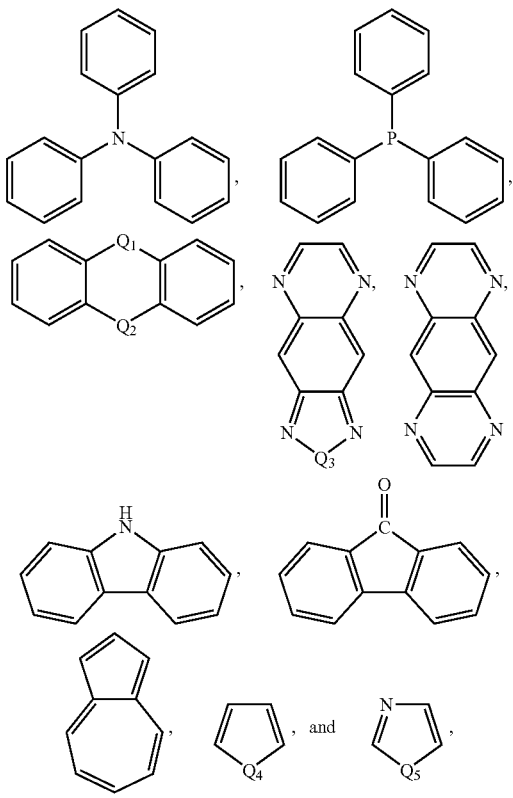

where each of $Q_1$, $Q_2$, $Q_3$, $Q_4$, and $Q_5$ can be independently N, O, or S. It will be appreciated by one of ordinary skill in the art that the hole transport unit in formulae (1) through (3) can be a monovalent group or a divalent group.

In formulae (1) through (3), the electron transport unit can be, but is not limited to,

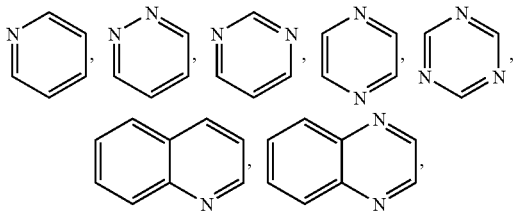

-continued

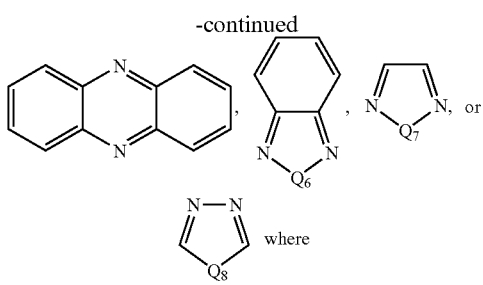
where each of $Q_6$, $Q_7$ and $Q_8$ can be independently N, O, or S. It will be appreciated by one of ordinary skill in the art that the electron transport unit in formulae (1) through (3) can be a monovalent group or a divalent group.

In formulae (1) through (3), the emissive unit may be a $C_6$-$C_{30}$ aromatic cyclic system or a $C_5$-$C_{30}$ hetero aromatic cyclic system. The term "aromatic cyclic system" includes one ring or at least two rings which are fused or are bonded by a single bond or a vinylene group.

In particular, examples of the emissive unit include, but are not limited to,

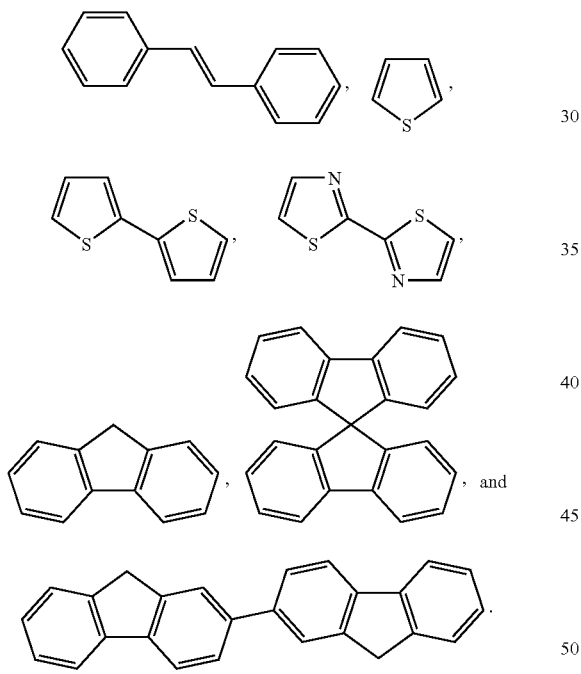

It will be appreciated by one of ordinary skill in the art that the emissive unit in formulae (1) through (3) can be a monovalent group or a divalent group.

Some of the above-described emissive units may be a hole transport unit or an electron transport unit. In this case, the emissive units have both the ability to emit light and the ability to transport holes or electrons.

Each of the alkyl group, aryl group, hole transport unit, electron transport unit, emissive unit, etc., can be unsubstituted or substituted with —F; —Cl; —Br; —CN; —NO₂; —OH; an unsubstituted or a —F, —Cl, —Br, —CN, —NO₂, or —OH substituted $C_1$-$C_{20}$ alkyl group; an unsubstituted or a —F, —Cl, —Br, —CN, —NO₂, or —OH substituted $C_1$-$C_{20}$ alkoxy group; an unsubstituted or a $C_1$-$C_{20}$ alkyl, $C_1$-$C_{20}$ alkoxy, —F, —Cl, —Br, —CN, —NO₂, or —OH substituted $C_6$-$C_{30}$ aryl group; ; an unsubstituted or a $C_1$-$C_{20}$ alkyl, $C_1$-$C_{20}$ alkoxy, —F, —Cl, —Br, —CN, —NO₂, or —OH substituted $C_2$-$C_{30}$ heteroaryl group; an unsubstituted or a $C_1$-$C_{20}$ alkyl, $C_1$-$C_{20}$ alkoxy, —F, —Cl, —Br, —CN, —NO₂, or —OH substituted $C_5$-$C_{20}$ cycloalkyl group; or an unsubstituted or a $C_1$-$C_{20}$ alkyl, $C_1$-$C_{20}$ alkoxy, —F, —Cl, —Br, —CN, —NO₂, or —OH substituted $C_5$-$C_{30}$ heterocycloalkyl group.

In an embodiment of the present invention, the siloxane compound of formula (1) can be represented by one of formulae (1a), (1b), (1c), (1d), (1e), (1f), and (1g), but is not limited thereto.

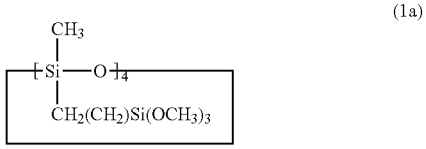
(1a)

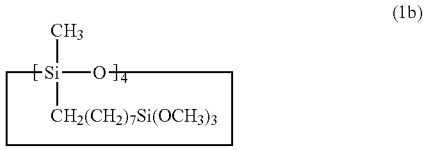
(1b)

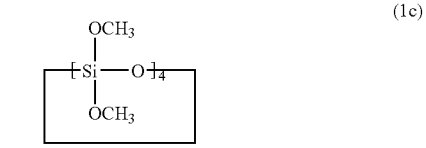
(1c)

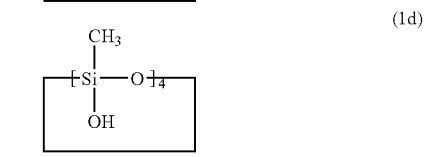
(1d)

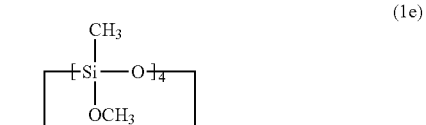
(1e)

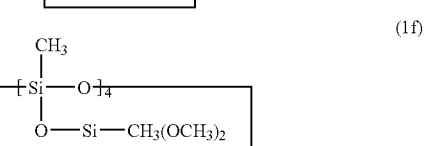
(1f)

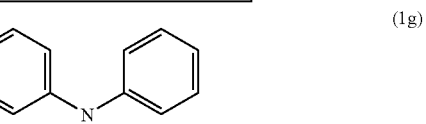
(1g)

In another embodiment of the present invention, the siloxane compound of formula (2) can be represented by one of formulae (2a), (2b), (2c), and (2d), but is not limited thereto.

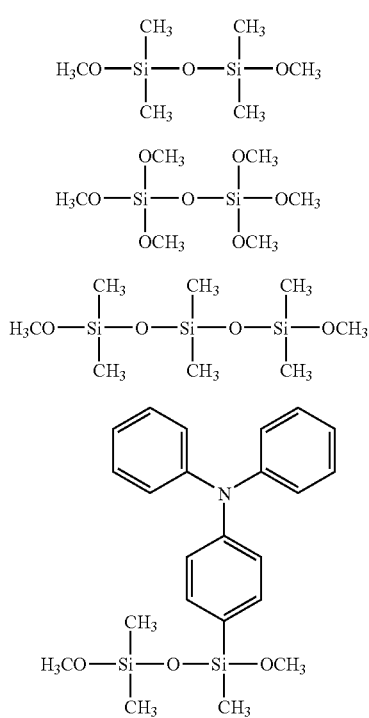

In another embodiment of the present invention, the silane compound of formula (3) can be represented by one of formulae (3a), (3b), (3c), and (3d), but is not limited thereto.

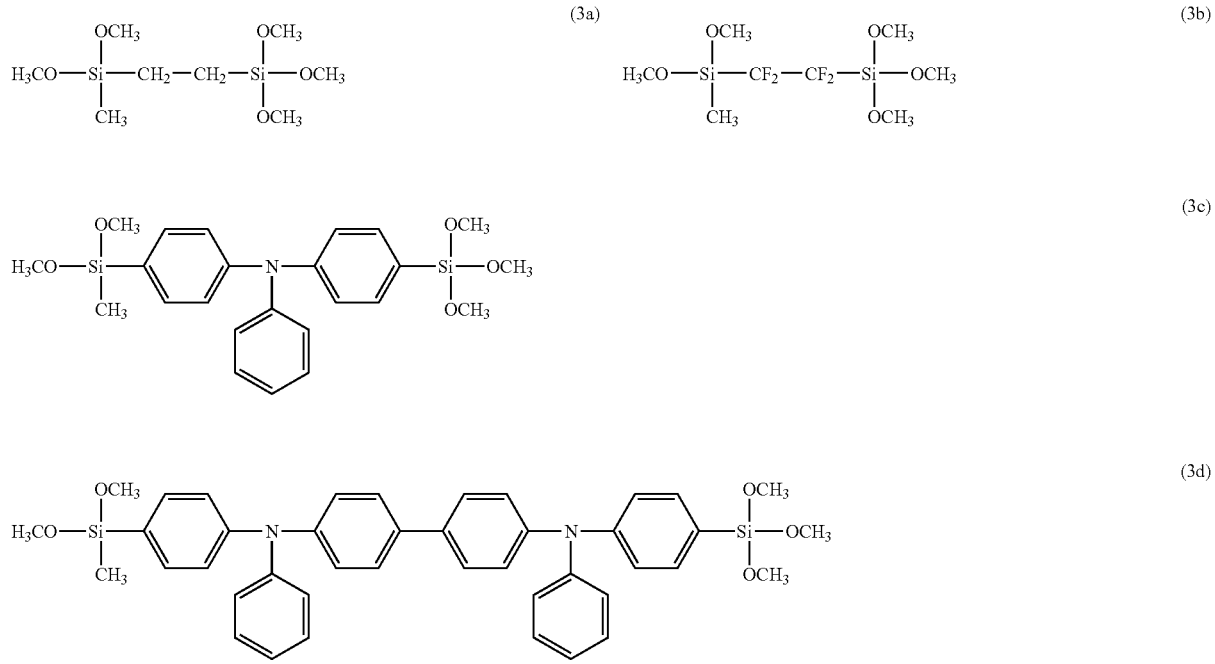

The conducting polymer composition according to an embodiment of the present invention includes a conducting polymer, in addition to the siloxane compound and/or the silane compound. Any polymer having conductivity can be used as the conducting polymer without limitation. Examples of the conducting polymer include polythiophene, polyaniline, polypyrrole, polyacetylene, polyvinylenephenylene, polyphenylene, polyfluorene, poly(ethylenedioxythiophene), poly(arylamine), a derivative thereof, etc.

The conducting polymer composition according to an embodiment of the present invention may include at least one of the siloxane compound of formula (1), the siloxane compound of formula (2), and the silane compound of formula (3), and the conducting polymer in a weight ratio of 0.1:99.9-20:80, preferably, 0.1:99.9-10:90. When the amount of the siloxane compound and/or the silane compound is below the range, the effect of forming a network of conducting polymer chains is negligible. When the amount of the siloxane compound and/or the silane compound is above the range, the conductivity of a layer formed using the composition is too low.

The conducting polymer composition according to an embodiment of the present invention may further include an acid. The acid may include at least one atom selected from the group consisting of C, S, N, O, Si, F, Cl, and H; and/or at least one functional group selected from the group consisting of a hydroxyl group, a $C_1$-$C_{20}$ alkyl hydroxyl group, a $C_1$-$C_{20}$ alkoxy group, a $C_1$-$C_{20}$ alkyl group, a halogen atom, a cyano group, a nitro group, a $C_6$-$C_{30}$ aryl group, a $C_1$-$C_{20}$ alkylamino group, a $C_6$-$C_{30}$ aryloxy group, a $C_6$-$C_{30}$ arylamino group, a $C_1$-$C_{20}$ alkyl epoxy group, a vinyl group, a $C_1$-$C_{20}$ alkylmercapto group, an acetoxy group, a thiol group, and an imide group.

Preferably, the acid may include organic ions, such as sulfonic acid, phosphonic acid, or carboxylic acid, and counter ions, such as H or alkali metal ions.

The acid can be paired with a conducting polymer, for example, like Pani/DBSA (Polyaniline/Dodecylbenzenesulfonic acid), PEDOT/PSS (Poly(3,4-ethylenedioxythiophene)/Poly(4-styrenesulfonate), Pani/CSA (Polyaniline/Camphor sulfonic acid), PANI/PSS (Polyaniline/Poly(4-styrenesulfonate)), Pani/PAAMPSA (Polyaniline/Poly(2-acrylamido-2-methyl-1-propanesulfonic acid), etc.

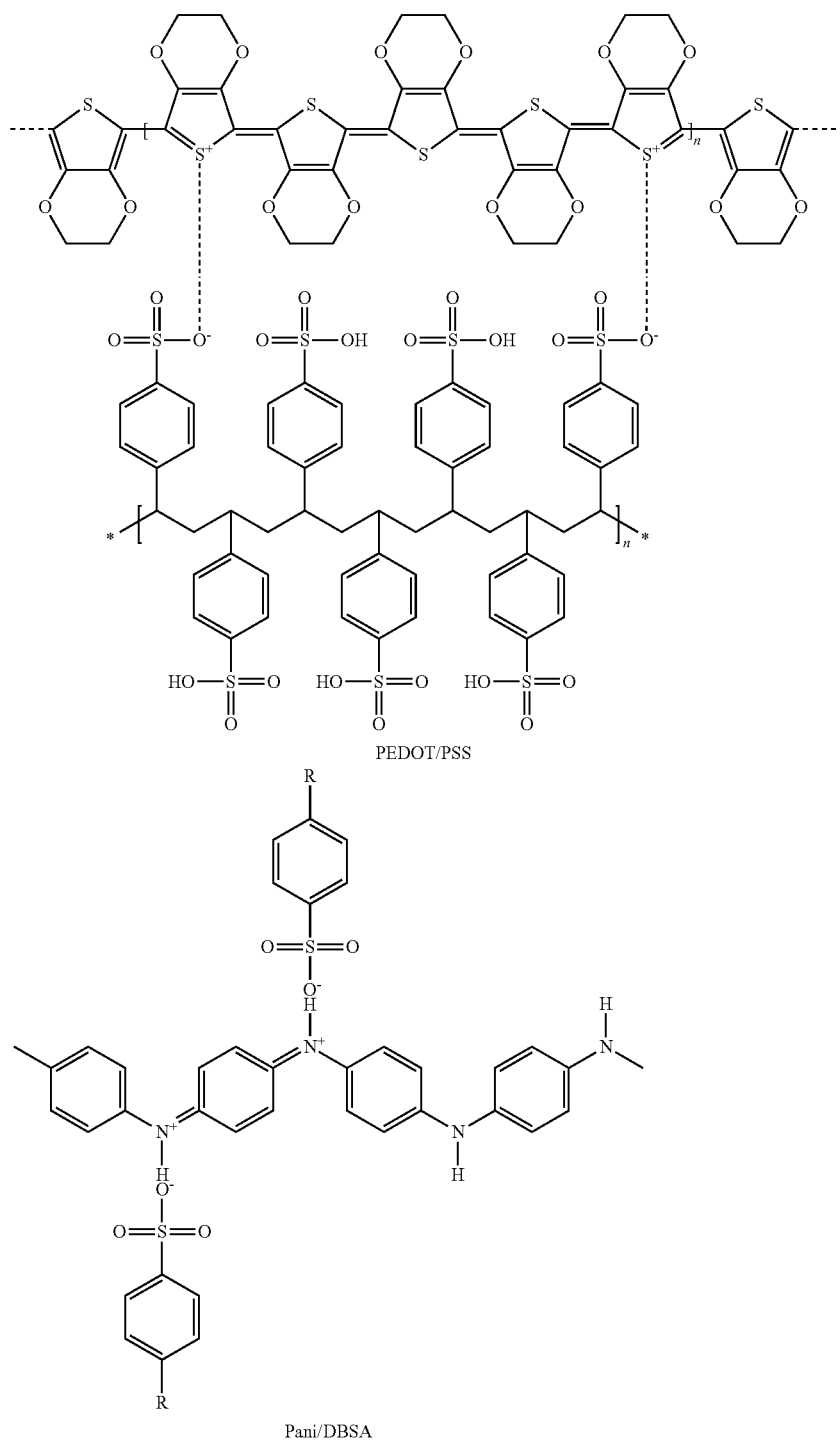

PEDOT/PSS

Pani/DBSA he conducting polymer composition according to an embodiment of the present invention may further include a crosslinking agent. The crosslinking agent assists the siloxane compound and/or the silane compound in networking conducting polymer chains. Any common crosslinking agent can be used. For example, an epoxy crosslinking agent, an acrylate crosslinking agent, etc., but not limited thereto, can be used.

The conducting polymer composition according to an embodiment of the present invention may further include metal nanoparticles. The metal nanoparticles further improve the conductivity of the layer obtained using the conducting polymer composition.

The metal nanoparticles can be at least one kind of nanoparticles selected from the group consisting of Au, Ag, Cu, Pd, and Pt nanoparticles. The metal nanoparticles may have an average particle diameter of 5-20 nm. When the average particle diameter of the metal nanoparticles is smaller than 5 nm, the nanoparticles may easily aggregate. When the average particle diameter of the metal nanoparticles is larger than 20 nm, the surface smoothness of the layer cannot be controlled.

The conducting polymer composition according to an embodiment of the present invention may further include inorganic nanoparticles. When forming a layer using the conductive polymer composition, the inorganic nanoparticles disperse in the layer and make conduction in the network of conductive polymer chains in the network easier and enhance the network.

The inorganic nanoparticles can be at least one kind of clay nanoparticles, $SiO_2$ nanoparticles and $TiO_2$ nanoparticles. The average diameter of the inorganic nanoparticles can be in a range of 5-20 nm. When the average diameter of the inorganic nanoparticles is less than 5 nm, the nanoparticles easily agglomerate. When the average diameter of the inorganic nanoparticles is larger than 20 nm, it is difficult to control the surface smoothness of the layer.

When forming a layer using the conducting polymer composition, for example, after the conducting polymer composition is dissolved or dispersed in a predetermined solvent and coated on a predetermined substrate, drying and/or thermal treatment can be performed.

The solvent provides a viscosity to the conducting polymer composition described above. Any solvent that can dissolve or disperse the conducting polymer composition can be used without limitation. Examples of the solvent include, but are not limited to, water, alcohol, toluene, xylene, chlorobenzene, chloroform, di-chloroethane, dimethylformamide, dimethyl sulfoxide, etc. The conducting polymer composition can be coated on a predetermined substrate using various known methods, for example, spin coating, dip coating, inkjet printing, nozzle printing, etc. The coated layer is dried and/or thermally treated, thereby completing the formation of the layer.

The layer obtained using the conducting polymer composition described above is suitable to be used as a conducing layer of various electronic devices. Examples of electronic devices include, but are not limited to, organic light-emitting devices, photovoltaic devices, electrochromic devices, electrophoretic devices, organic thin film transistors, organic memory devices, etc.

In particular, an electronic device including the layer obtained using the conducting polymer composition according to an embodiment of the present invention can be an organic light-emitting device. In general, the organic light-emitting device has a structure including a first electrode, a second electrode, and an emitting layer between the first and second electrodes. Alternatively, the organic light-emitting device can have various structures, for example, a structure further including between the first and second electrodes at least one layer such as a hole injecting layer, a hole transporting layer, a hole blocking layer, an electron blocking layer, an electron transporting layer, and an electron injecting layer. When manufacturing an organic light-emitting device, the layer obtained using the conducting polymer composition according to an embodiment of the present invention can be used as a hole injecting layer or a hole transporting layer of the organic light-emitting device.

Figure 1B:
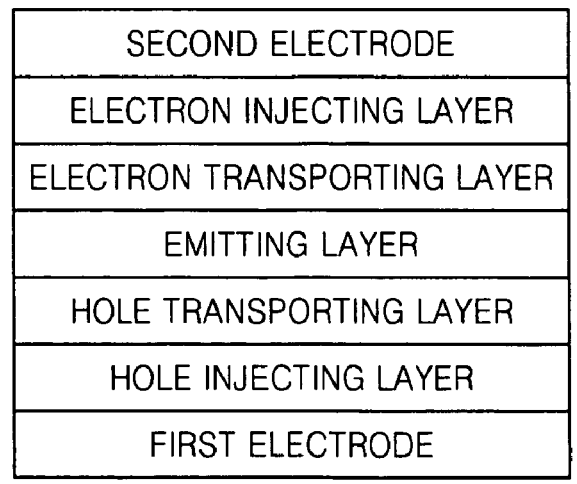

Schematic structures of organic light-emitting devices as electronic devices according to embodiments of the present invention are shown in FIGS. 1A, 1B, and 1C. The organic light-emitting device of FIG. 1A has a structure including a first electrode, a hole injecting layer, an emitting layer, an electron transporting layer, an electron injecting layer, and a second electrode. The organic light-emitting device of FIG. 1B has a structure including a first electrode, a hole injecting layer, a hole transporting layer, an emitting layer, an electron transporting layer, an electron injecting layer, and a second electrode. The organic light-emitting device of FIG. 1C has a structure including a first electrode, a hole injecting layer, a hole transporting layer, an emitting layer, a hole blocking layer, an electron transporting layer, an electron injecting layer, and a second electrode. Organic light-emitting devices can have other various structures, for example, a structure including a first electrode, a hole injecting layer, an emitting layer, and a second electrode.

The emitting layer of an organic light-emitting device according to an embodiment of the present invention can contain a phosphorescent or fluorescent dopant of red, green, blue, or white. The phosphorescent dopant can be an organic metal compound containing at least one selected from the group consisting of Ir, Pt, Os, Ti, Zr, Hf, Eu, Tb, and Tm.

Hereinafter, a method of manufacturing an organic light-emitting device according to an embodiment of the present invention will be described with reference to the organic light-emitting device shown in FIG. 1C.

Initially, a first electrode is formed on a substrate using a first electrode material by deposition, sputtering, or etc. The first electrode can be an anode. Any substrate commonly used in organic light-emitting devices can be used. For example, a glass substrate which is mechanically strong, thermally stable, transparent, easy to handle, and highly waterproof, and has excellent surface flatness, or a transparent plastic substrate can be used. Examples of the first electrode material include indium tin oxide (ITO), indium zinc oxide (IZO), tin oxide ($SnO_2$), zinc oxide (ZnO), etc., which are transparent and have excellent conductivity.

Next, a hole injecting layer (HIL) is formed on the first electrode using various methods, for example, vacuum deposition, spin coating, inkjet printing, nozzle printing, spray printing, organic vapour jet printing, organic vapour phase deposition, casting, LB, etc.

When forming the hole injecting layer (HIL) using vacuum deposition, the deposition conditions can vary according to the compound used as a material for the hole injecting layer, the structure or thermal characteristics of the hole injecting layer, etc. In general, the deposition temperature can be in a range of 100-500° C., the degree of vacuum can be in a range of $10^{-8}$ or $10^{-3}$ torr, and the deposition rate can be in a range of 0.01-100 Å/sec.

When forming the hole injecting layer (HIL) using spin coating, the coating conditions can vary according to the compound used as a material for the hole injecting layer, the structure or thermal characteristics of the hole injecting layer, etc. In general, the coating rate can be in a range of 2,000-5,000 rpm, and the temperature of a thermal treatment performed to remove solvent after the coating can be in a range of 80-200° C.

The hole injecting layer can be formed using the conducting polymer composition according to an embodiment of the present invention described above. Alternatively, examples of a material for the hole injecting layer include, but are not limited to, phthalocyanine compounds, such as copper phthalocyanine, etc., disclosed in U.S. Pat. No. 4,356,429, starburst type amine derivatives disclosed in Advanced Material 6, p. 677 (1994), such as TCTA, m-MTDATA, and m-MT-DAPB, Pani/DBSA (Polyaniline/Dodecylbenzenesulfonic acid), PEDOT/PSS (Poly(3,4-ethylenedioxythiophene)/Poly (4-styrenesulfonate), for example, Baytron® P series Products of H.C. Starck GmBH Co.), Pani/CSA (Polyaniline/Camphor sulfonic acid), PANI/PSS ((Polyaniline)/Poly (4-styrenesulfonate)), Pani/PAAMPSA (Polyaniline/Poly(2-acrylamido-2-methyl-1-propanesulfonic acid), etc.

The thickness of the hole injecting layer can be 50-10,000 Å, for example, 50-1,000 Å. When the thickness of the hole injecting layer is less than 50 Å, hole injection characteristics may deteriorate. When the thickness of the hole injecting layer exceeds 10,000 Å, the driving voltage increases.

Next, a hole transporting layer (HTL) can be formed on the hole injecting layer using various methods, such as vacuum deposition, spin coating, inkjet printing, nozzle printing, spray printing, organic vapour jet printing, organic vapour phase deposition, casting, LB, etc. When the hole transporting layer (HTL) is formed using vacuum deposition or spin coating, the deposition conditions and the coating conditions can vary according to the compound used as a material for the hole transporting layer (HTL). However, in general, the deposition conditions and the coating conditions are determined in the same ranges as applied to form the hole injecting layer (HIL).

The hole transporting layer (HTL) can be formed using the conducting polymer composition according to an embodiment of the present invention described above. Alternatively, examples of a material for the hole transporting layer (HTL) include, but are not limited to, common hole transporting materials, for examples, carbazole derivatives, N-phenyl carbazole, polyvinyl carbazole, etc., general amine derivatives having an aromatic fused ring, such as N,N'-bis (3-methyl phenyl)-N,N'-diphenyl-[1,1-biphenyl]-4,4'-diamine (TPD), N,N'-di(naphthalene-1-yl)-N,N'-diphenyl benzidine (a-NPD), etc., PEDOT/PSS (for example, Baytron® P series products of H C. Starck GmbH Co.).

The thickness of the hole transporting layer may be in a range of 50-1,000 Å, for example, 100-600 Å. When the thickness of the hole transporting layer is less than 50 Å, the hole transportation characteristics degrade. When the thickness of the hole transporting layer exceeds 1,000 Å, the driving voltage increase.

Next, the emitting layer (EML) is formed on the hole transporting layer (HTL) using vacuum deposition, spin coating, inkjet printing, nozzle printing, casting, LB, etc. When the emitting layer (EML) is formed using vacuum deposition or spin coating, the deposition conditions and the coating conditions can vary according to the compound used as a material for the emitting layer (EML). However, in general, the deposition conditions and the coating conditions are determined in the same ranges as applied to form the hole injecting layer (HIL).

The emitting layer (EML) can be formed using a material which is known as a material for the emitting layer (EML). Examples of the material for the emitting layer (EML) include, but are not limited to, polyfluorene polymers, polyphenylene polymers, polyphenylenevinylene polymers, polythiophene polymers, polyquinoline polymers, polypyrrole polymers, polyacetylene polymers, spirofluorene polymers, for example, a spirofluorene polymer including indenofluorene repeating units having a spiroanthracene structure, cyclopentaphenanthrene polymers, polyarylene polymers having an indole carbazole unit or phenoxazine unit, a derivative thereof, which can be used in combination of two or more. In addition to polymers, low molecular materials or oligomers can be used for the emitting layer. A combination of a host and a dopant can be used. Examples of the host include, but are not limited to, Alq3, CBP (4,4'-N,N'-dicarbazolyl-biphenyl), PVK (poly(n-vinylcarbazole)), mCP (N,N'-dicarbazolyl-3,5-benzene), etc. Examples of fluorescent dopants include IDE102, IDE105, which are available from Idemitsu Co., C545T, which is available from Hayashibara Co., LUMTEC Co., and etc. Examples of phosphorescent dopants include, but are not limited to, PtOEP, RD 61 of UDC Co., which are red phosphorescent dopants, Ir (PPy)3 (PPy=2-phenylpyridine), which is a green phosphorescent dopant, F2Irpic, which is a green phosphorescent dopant, etc.

Other examples of materials which can be used for the emitting layer (EML) are disclosed in Korean Patent Publication Nos. 2005-0077367, 2005-0056001, 2005-0032691, 2004-0056662, and 2003-0097658 and U.S. Pat. No. 6,900,285, U.S. Pat. No. 6,605,373, U.S. Pat. No. 5,728,801, etc., the disclosures of which are incorporated herein in their entirety by reference.

The amount of dopants is not specifically limited, but can be in a range of 0.01-15 parts by weight based on 100 parts by weight of the host.

The thickness of the emitting layer can be in a range of 100-2,000 Å, for example, 200-1,000 Å. When the thickness of the emitting layer is less than 100 Å, the emitting characteristics may degrade. When the thickness of the emitting layer exceeds 2,000 Å, the driving voltage rises.

When a phosphorescent dopant is used in the emitting layer (EML), to prevent diffusion of triplet excitons or holes into the electron transporting layer (ETL), a hole blocking layer (HBL) can be formed on the emitting layer (EML) using vacuum deposition, spin coating, inkjet printing, nozzle printing, spray printing, organic vapour jet printing, organic vapour phase deposition, casting, LB, etc. When forming the hole blocking layer (HBL) using vacuum deposition or spin coating, the deposition conditions and the coating conditions can vary according to the compound used as a material for the hole blocking layer (HBL). However, in general, the deposition conditions and the coating conditions are determined in the same ranges as applied to form the hole injecting layer (HIL). Examples of a material for the hole blocking layer (HBL) that can be used include, for example, oxadiazole derivatives, triazole derivatives, phenanthroline derivatives, BCP (2,9-Dimethyl-4,7-diphenyl-1,10-phenanthroline), etc.

The thickness of the hole blocking layer (HBL) can be in a range of 50-1,000 Å, for example, 100-300 Å. When the thickness of the hole blocking layer (HBL) is less than 50 Å, the hole blocking characteristics may deteriorate. When the thickness of the hole blocking layer (HBL) exceeds 1,000 Å, the driving voltage rises.

Next, an electron transporting layer (ETL) is formed using various methods, for example, vacuum deposition, spin coating, inkjet printing, nozzle printing, spray printing, organic vapour jet printing, organic vapour phase deposition, casting, etc. When the electron transporting layer (ETL) is formed using vacuum deposition or spin coating, the deposition conditions and the coating conditions can vary according to the compound used as a material for the electron transporting layer (ETL). However, in general, the deposition conditions and the coating conditions are determined in the same ranges as applied to form the hole injecting layer (HIL). Any common material that can stably transport electrons injected from an electron injecting electrode (cathode), for example, tris (8-quinolinolate) aluminium (Alq3), TAZ (3-(4-Biphenylyl)-4-phenyl-5-tert-butylphenyl-1,2,4-triazole), BAlq (Bis-(2-methyl-8-quinolinolate)-4-(phenylphenolato) aluminum), etc., can be used for the electron transporting layer (ETL).

The thickness of the electron transporting layer (ETL) can be in a range of 100-1,000 Å, for example, 200-500 Å. When the thickness of the electron transporting layer (ETL) is less than 100 Å, the electron transport characteristics may deteriorate. When the thickness of the electron transporting layer (ELT) exceeds 1,000 Å, the driving voltage increases.

In addition, an electron injecting layer (EIL), which allows electrons to be easily injected from the cathode, may be formed on the electron transporting layer (ETL). Any materials which are known as materials for the electron injecting layer (EIL), for example, LiF, BaF$_2$, Cs$_2$CO$_3$, NaCl, CsF, Li$_2$O BaO, etc., can be used. The electron injecting layer (EIL) can be formed, for example, vacuum deposition. The deposition conditions can vary according to the compound used as a material for the electron injecting layer (EIL). The deposition rate can be in a range of 0.01-1 Å/s, for example, 0.1-0.5 Å/s. When the deposition rate is less than 0.01 Å/s, an accurate thickness is not guaranteed, and the deposition time increases. When the deposition rate exceeds 1 Å/s, it is difficult to control the thickness of the electron injecting layer (EIL).

The thickness of the electron injecting layer (EIL) can be in a range of 1-500 Å, for example, 5-50 Å. When the thickness of the electron injecting layer (EIL) is less than 1 Å, the electron injection characteristics may deteriorate. When the thickness of the electron injecting layer (EIL) exceeds 500 Å, the driving voltage increases.

Finally, a second electrode is formed on the electron injecting layer (EIL) using vacuum deposition, sputtering, etc. The second electrode can be used as a cathode. Examples of a material for the second electrode include a metal having a low work function, an alloy thereof, an electrically conductive compound, a combination thereof, etc. Examples of the material for the second electrode include, but are not limited to, lithium (Li), magnesium (Mg), barium (Ba), aluminium (Al), aluminum-lithium (Al—Li), aluminium-barium (Al—Ba), calcium (Ca), magnesium-indium (Mg—In), magnesium-silver (Mg—Ag), etc. The second electrode can have a single-layered structure, a multi-layered structure, or other various structures. In a front emission light-emitting device, a transmissive cathode formed using ITO, IZO, etc., can be used.

Hereinafter, the present invention will be described in greater detail with reference to the following synthesis examples for compounds of formula (1a) through (1f), (2a), and (2b) and examples. The following examples are for illustrative purpose only and are not intended to limit the scope of the invention.

EXAMPLES

Synthesis Example 1

Synthesis of Compound of Formula (1a)

29.014 mmol (10.0 g) of 2,4,6,8-tetramethyl-2,4,6,8-tetravinyl cyclotetrasiloxane and 0.164 g of platinum(0)-1,3-divinyl-1,1,3,3-tetramethyldisiloxane complex dissolved in a xylene solution were put into a flask and diluted with 300 mL of diethylether. The temperature of the flask was lowered to −78° C., 127.66 mmol (17.29 g) of trichlorosilane was slowly added, and the reaction temperature was slowly raised to room temperature. After the reaction was allowed at room temperature for 20 hours, a volatile substance was removed under a reduced pressure of about 0.1 Torr. 100 mL of pentane was added to the product, stirred for 1 hour, and filtered through a Celite filter to obtain a solution. The pentane was removed from the solution under a reduced pressure of about 0.1 Torr to obtain a liquid compound of formula below.

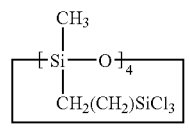

11.28 mmol (10.0 g) of the liquid compound was diluted with 500 mL of tetrahydrofuran, and 136.71 mmol (13.83 g) of triethylamine was added. Subsequently, the reaction temperature was lowered to −78° C., 136.71 mmol (4.38 g) of methanol was slowly added, and the reaction temperature was slowly raised to room temperature. After the reaction was allowed at room temperature for 15 hours, the reaction product was filtered through a Celite filter, and a volatile substance was removed under a reduced pressure of about 0.1 Torr. 100 mL of pentane was added to the product, stirred for 1 hour, and filtered through a Celite filter to obtain a colorless, clear solution. The pentane was removed from the solution under a reduced pressure of about 0.1 Torr to obtain a compound of formula (1a) below.

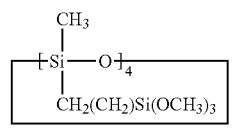

The compound of formula (1a) was dissolved in CDCl$_3$ and analyzed using NMR. The results are as follows:

1H-NMR(300 MHz): δ 0.09(s, 12H, 4×—CH$_3$), 0.52~0.64 (m, 16H, 4×—CH$_2$CH$_2$—), 3.58(s, 36H, 4×—[OCH$_3$]$_3$).

Synthesis Example 2

Synthesis of Compound of Formula (1b)

8.32 mmol (2.0 g) of 2,4,6,8-tetramethylcyclotetrasiloxane and 0.034 g of platinum(0)-1,3-divinyl-1,1,3,3-tetramethyldisiloxane complex dissolved in a xylene solution were put into a flask and diluted with 100 mL of toluene. 33.36 mmol (7.75 g) of trimethoxy(7-octen-1-yl)silane was slowly added, and the reaction temperature was slowly raised to 75° C. After the reaction was allowed for 36 hours, a volatile substance was removed under a reduced pressure of about 0.1 Torr. 100 mL of pentane was added to the product, stirred for 1 hour, and filtered through a Celite filter to obtain a solution. The pentane was removed from the solution under a reduced pressure of about 0.1 Torr to obtain a compound of formula (1b) below.

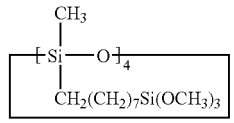

The compound of formula (1b) was dissolved in CDCl$_3$ and analyzed using NMR. The results are as follows:

1H-NMR(300 MHz): 67 0.11(s, 12H, 4×—CH$_3$), 0.48~0.53(m, 8H, 4×—CH$_2$—), 0.86~0.90(m, 8H, 4×—CH$_2$—), 1.15~1.71(m, 48H, 4×—[CH$_2$]$_6$—), 3.58(s, 36H, 4×—[OCH$_3$]$_3$).

Synthesis Example 3

Synthesis of Compound of Formula (1c)

31.5 mmol (25.0 g) of octaphenyl tetracyclosiloxane and 37.5 mmol (5.0 g) of aluminum chloride were put into a dried flask and dissolved in benzene. The solution was bubbled with HCl gas until saturated and reacted at room temperature for 12 hours while stirring. After the reaction was complete, excess HCl was removed from the reaction solution through bubbling with $N_2$ gas, and the reaction solution was neutralized with triethylamine to pH 7. Next, excess methanol and triethylamine were added, and filtered through a Celite filter. The resulting filtrate was left under a reduced pressure of 0.1 Torr to remove a volatile substance and then concentrated. 100 mL of diethylether was added into the concentrate, stirred for 1 hour, and filtered through a Celite filter. 5 g of activated carbon was added into the filtrate, stirred for 10 hours, and filtered through a Celite filter. Hexane was removed from the filtrate under a reduced pressure of about 0.1 Torr to obtain a compound of formula (1c) below.

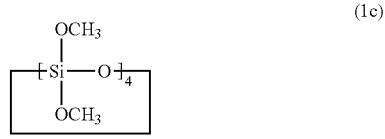
(1c)

The compound of formula (1c) was dissolved in acetone-$d_6$ and analyzed using NMR. The results are as follows:
1H-NMR(300 MHz): δ 3.58(s, 24H, 8×[—$OCH_3$]).

Synthesis Example 4

Synthesis of Compound of Formula (1d)

41.6 mmol (10.00 g) of 2,4,6,8-tetramethyl-2,4,6,8-cyclotetrasiloxane was put into a flask and diluted with 100 mL of tetrahydrofuran. Next, 200 mg of 10 wt % of palladium/charcoal (Pd/C) was added. Subsequently, 177.8 mmol (3.20 mL) of distilled water was added, and generated hydrogen gas was removed. After the reaction was allowed at room temperature for 15 hours, the reaction solution was filtered through a Celite filter and $MgSO_4$, and the filtrate was left under a reduced pressure of about 0.1 Torr to remove a volatile substance. As a result, a compound of formula (1d) was obtained.

(1d)

The compound of formula (1d) was dissolved in acetone-$d_6$ and analyzed using NMR. The results are as follows:
1H-NMR(300 MHz): δ 0.067(s, 12H, 4×[—$CH_3$]), 5.52(s, 4H, 4×[—OH]).

Synthesis Example 5

Synthesis of Compound of Formula (1e)

21.4 mol (3.8 g) of $PdCl_2$ (II) was put into a flask and dissolved in 100 mL of $CCl_4$. 41.6 mmol (10.00 g) of 2,4,6,8-tetramethyl-2,4,6,8-cyclotetrasiloxane was slowly added. After the reaction was allowed at room temperature for about 10 minutes, and the reaction solution was filtered through a Celite filter and $MgSO_4$, and the filtrate was left under a reduced pressure of about 0.1 Torr to remove a volatile substance. As a result, a compound of formula (1e) was obtained.

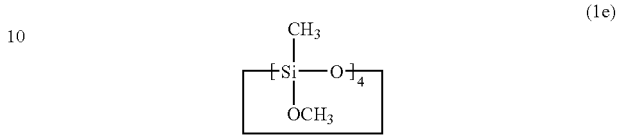
(1e)

The compound of formula (1e) was analyzed using NMR. The results are as follows:
1H-NMR(300 MHz): δ 0.067(s, 12H, 4×[—$CH_3$]), 3.55(s, 3H, 4×[—$OCH_3$]).

Synthesis Example 6

Synthesis of Compound of Formula (1f)

41.6 mmol (12.6 g) of the compound of formula (1d) synthesized in Synthesis Example 4 was diluted with 200 mL of tetrahydrofuran (THF), and 177.8 mmol (13.83 g) of triethylamine was added into the solution. After the temperature of the solution was lowered to –0° C., 177.8 mmol (25.0 g) of chlorodimethoxymethylsilane was slowly added, the temperature was slowly raised to room temperature, and the reaction was allowed for 15 hours. The reaction solution was filtered through a Celite filter, and the filtrate was left under a reduced pressure of about 0.1 Torr to remove a volatile substance. As a result, a colorless, liquid compound of formula (1f) was obtained.

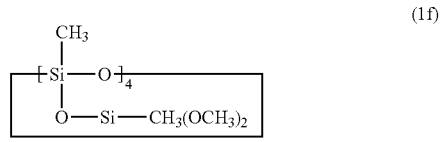
(1f)

The compound of formula (1f) was analyzed using NMR. The results are as follows:
1H-NMR(300 MHz): δ 0.12(s, 12H, 4×[—$CH_3$]), 0.24(s, 12H, 4×[—$CH_3$]), 3.53(s, 24H, 4×[—$OCH_3$]$_2$).

Synthesis Example 7

Synthesis of Compound of Formula (2a)

249.208 mmol (10.0 g) of 1,3-dichlorotetramethyldisiloxane was put into a flask and diluted with 500 mL of tetrahydrofuran. The temperature of the flask was lowered to –78° C., 108.212 mmol (10.95 g) of triethylamine was added, 107.990 mmol (3.46 g) of methanol was slowly added, and the reaction temperature was slowly raised to room temperature. After the reaction was allowed at room temperature for 15 hours, the reaction product was filtered through a Celite filter, and a volatile substance was removed under a reduced pressure of about 0.1 Torr. 100 mL of hexane was added to the product, stirred for 1 hour, and filtered through a Celite filter to obtain a solution. The hexane was removed from the solution under a reduced pressure of about 0.1 Torr. A resulting colorless, liquid was subjected to simple distillation to obtain a compound of formula (2a) below in colorless liquid form.

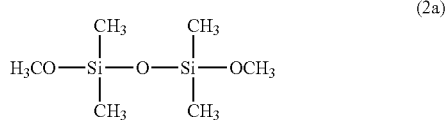

The compound of formula (2a) was dissolved in CDCl$_3$ and analyzed using NMR. The results are as follows:

$^1$H NMR(300 MHz) data; δ 0.068(s, 12H, 4×—CH$_3$), 3.45 (s, 6H, 2×—OCH$_3$).

Synthesis Example 8

Synthesis of Compound of Formula (2b)

2.8 g (9.83 mmol) of hexachlorodisiloxane diluted with 150 mL of methanol was put into a flask, and 7.94 g (78.69 mmol) of triethylamine was added. After the reaction was allowed at room temperature for 2 hours, the reaction solution was filtered through a Celite filter, left under a reduced pressure of about 0.1 Torr to remove a volatile substance, and concentrated. 100 mL of hexane was added to the concentrate, stirred for 1 hour, and filtered through a Celite filter. The filtrate was left under a reduced pressure of about 0.1 Torr to remove hexane. As a result, a compound of formula (2b) below was obtained.

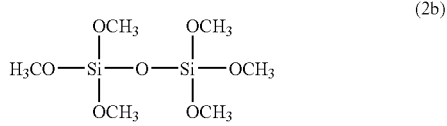

The compound of formula (2b) was dissolved in acetone-d$_6$ and analyzed using NMR. The results are as follows:

$^1$H NMR(300 MHz) data; δ 3.58(s, 18H, 6×[—OCH$_3$]).

Example 1

An organic light-emitting device including a hole injecting layer obtained using a conducting polymer composition containing PEDOT-PSS (Poly(3,4-ethylene dioxythiophene)/Poly(4-styrenesulfonate)) as a conducting polymer and acid, and the compound of formula (1a) obtained in Synthesis Example 1 was manufactured. The organic light-emitting device had a structure of IZO/PEDOT-PSS+ compound of formula (1a) (500 Å)/DowGreen K2(LUMATION 1300) (800 Å)/Ba (50 Å) Al (1500 Å).

An anode was manufactured by cutting an IZO glass substrate (15 Ω/cm$^2$, 1,000 Å) into a size of 50 mm×50 mm×0.7 mm, ultrasonicating the cut substrate in detergent solution, distilled water, acetone, and then isopropyl alcohol for 15 minutes each, and UV-ozone treatment for 20 minutes. PEDOT-PSS as a conducting polymer and acid with the product name of Baytron® P ETV2 (available from H C. Starch, and GmbH Co., Weight ratio of PEDOT and PSS=1:16), and the compound of formula (1a) were added to a mixture of water and alcohol to prepare a conducting polymer composition. The weight ratio of PEDOT-PSS and the compound of formula (1a) was 97:3. The conducting polymer composition was spin-coated on a substrate at 2,000 rpm and thermally treated in air at 200° C. for 5 minutes to form a hole injecting layer having a thickness of 500 Å. 1.2 wt % of DowGreen K2 (available from Dow Chemical Co., Product Name: LUMATION 1300) dissolved in toluene was spin-coated as a green emitting material on the hole injecting layer at 2,000 rpm and thermally treated at 100° C. for 15 minutes to form an emitting layer having a thickness of 800 Å. Next, a cathode was formed by sequentially depositing Ba and Al on the emitting layer to 50 Å and 1500 Å, respectively, thereby resulting in an organic light-emitting device. This organic light-emitting device was referred to as Sample 1a.

Example 2

An organic light-emitting device having a structure of IZO/PEDOT-PSS+compound of formula (1b) (500 Å)/DowGreen K2(LUMATION 1300) (800 Å)/Ba (50 Å) Al (1500 Å) was manufactured in the same manner as in Example 1, except that the compound of formula (1b) obtained in Synthesis Example 2, instead of the compound of formula (1a), was used. This organic light-emitting device was referred to as Sample 1b.

Example 3

An organic light-emitting device having a structure of IZO/PEDOT-PSS+compound of formula (1c) (500 Å)/DowGreen K2(LUMATION 1300) (800 Å)/Ba (50 Å) Al (1500 Å) was manufactured in the same manner as in Example 1, except that the compound of formula (1c) obtained in Synthesis Example 3, instead of the compound of formula (1a), was used. This organic light-emitting device was referred to as Sample 1c.

Example 4

An organic light-emitting device having a structure of IZO/PEDOT-PSS+compound of formula (1d) (500 Å)/DowGreen K2(LUMATION 1300) (800 Å)/Ba (50 Å) Al (1500 Å) was manufactured in the same manner as in Example 1, except that the compound of formula (1d) obtained in Synthesis Example 4, instead of the compound of formula (1a), was used. This organic light-emitting device was referred to as Sample 1d.

Example 5

An organic light-emitting device having a structure of IZO/PEDOT-PSS+compound of formula (1e) (500 Å)/DowGreen K2(LUMATION 1300) (800 Å)/Ba (50 Å) Al (1500 Å) was manufactured in the same manner as in Example 1, except that the compound of formula (1e) obtained in Synthesis Example 5, instead of the compound of formula (1a), was used. This organic light-emitting device was referred to as Sample 1e.

Example 6

An organic light-emitting device having a structure of IZO/PEDOT-PSS+compound of formula (1f) (500 Å)/DowGreen K2(LUMATION 1300) (800 Å)/Ba (50 Å) Al (1500 Å) was manufactured in the same manner as in Example 1, except that the compound of formula (1f) obtained in Synthesis Example 6, instead of the compound of formula (1a), was used. This organic light-emitting device was referred to as Sample 1f.

Example 7

An organic light-emitting device having a structure of IZO/PEDOT-PSS+compound of formula (2a) (500 Å)/DowGreen K2(LUMATION 1300) (800 Å)/Ba (50 Å) Al (1500 Å) was manufactured in the same manner as in Example 1, except that the compound of formula (2a) obtained in Synthesis Example 7, instead of the compound of formula (1a), was used. This organic light-emitting device was referred to as Sample 2a.

Example 8

An organic light-emitting device having a structure of IZO/PEDOT-PSS+compound of formula (2b) (500 Å)/DowGreen K2(LUMATION 1300) (800 Å)/Ba (50 Å) Al (1500 Å) was manufactured in the same manner as in Example 1, except that the compound of formula (2b) obtained in Synthesis Example 8, instead of the compound of formula (1a), was used. This organic light-emitting device was referred to as Sample 2b.

Example 9

An organic light-emitting device having a structure of IZO/PEDOT-PSS+compound of formula (3a) (500 Å)/DowGreen K2(LUMATION 1300) (800 Å)/Ba (50 Å) Al (1500 Å) was manufactured in the same manner as in Example 1, except that the compound of formula (3a) (available from Aldrich), instead of the compound of formula (1a), was used. This organic light-emitting device was referred to as Sample 3a.

Comparative Example 1

An organic light-emitting device having a structure of IZO/DowGreen K2 (LUMATION 1300) (800 Å)/Ba (50 Å) Al (1500 Å) was manufactured in the same manner as in Example 1, except that no hole injecting layer was formed. This organic light-emitting device was referred to as Comparative Sample A.

Comparative Example 2

An organic light-emitting device having a structure of IZO/PEDOT-PSS (500 Å)/DowGreen K2 (LUMATION 1300) (800 Å)/Ba (50 Å) Al (1500 Å) was manufactured in the same manner as in Example 1, except that the hole injecting layer was formed using only PEDOT-PSS. This organic light-emitting device was referred to as Comparative Sample B.

Evaluation Example

The turn-on voltage, color purity, brightness, and maximum luminous efficiency were measured on Samples 1a through 1f, Samples 2a, 2b, and 3a, and Comparative Samples A and B using Keithley Source Measurement Unit 238 and PR650 (Spectroscan) Colorimeter, manufactured by Photo-Research, and the lifetime of each of the samples was measured using McScience Lifetime Tester Polaronix® M6000. The results are shown in Table 1. The brightness (cd/m$^2$) was measured at 6V, CIE chromaticity coordinates were obtained at 1,000 cd/m$^2$, and the lifetime was measured as the time which takes for an initial brightness of 1,000 cd/m$^2$ to reduce by half.

TABLE 1

| Sample No. | Turn-on Voltage (V) | CIE coordinates (1000 cd/m$^2$) | Brightness at 6 V (cd/m$^2$) | Maximum Efficiency (cd/A) | Lifetime at 1000 cd/m$^2$ (h) |
|---|---|---|---|---|---|
| Sample 1a | 2.2 | 0.40, 0.57 | 1114 | 14.1 | 120 |
| Sample 1b | 2.2 | 0.40, 0.57 | 1450 | 16.0 | 125 |
| Sample 1c | 2.2 | 0.40, 0.57 | 1200 | 15.2 | 125 |
| Sample 1d | 2.2 | 0.40, 0.57 | 1180 | 14.8 | 130 |
| Sample 1e | 2.2 | 0.40, 0.57 | 1210 | 15.3 | 145 |
| Sample 1f | 2.2 | 0.40, 0.57 | 1250 | 13.6 | 112 |
| Sample 2a | 2.2 | 0.40, 0.57 | 1480 | 16.1 | 150 |
| Sample 2b | 2.2 | 0.40, 0.57 | 1510 | 16.5 | 165 |
| Sample 3a | 2.2 | 0.40, 0.57 | 1590 | 17.1 | 190 |
| Comparative Sample A | 2.5 | 0.40, 0.57 | 37 | 0.30 | <1 |
| Comparative Sample B | 2.4 | 0.40, 0.57 | 1298 | 11.2 | 70 |

As is apparatus from Table 1, Samples 1a through 1f, and Samples 2a, 2b, and 3a according to an embodiment of the present invention have excellent electroluminescent characteristics and long device lifetimes.

As described above, a conducting polymer composition according to an embodiment of the present invention contains at least one of a siloxane compound of formula (1), a siloxane compound of formula (2), and a silane compound of formula (3), and a conducting polymer. A layer obtained using the conducting polymer composition has excellent electrical characteristics and durability due to a network of the compound and the conducting polymer. An electrical device having improved electrical and optoelectronic characteristics and longer device lifetime can be manufactured using the layer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A conducting polymer composition, comprising:
a conducting polymer;
at least one compound selected from the group consisting of a siloxane compound of formula (1), a siloxane compound of formula (2), and a silane compound of formula (3):

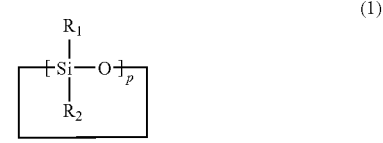

(1)

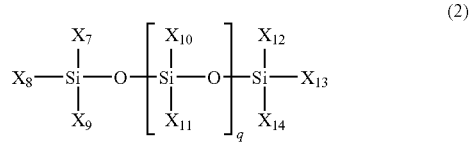

(2)

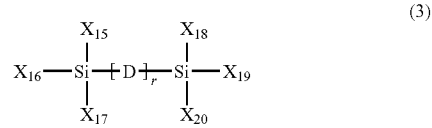

(3)

where each of $R_1$ and $R_2$ is independently selected from the group consisting of —CH$_2$(CH$_2$)$_m$SiX$_1$X$_2$X$_3$, —O—SiX$_4$X$_5$X$_6$, a cross-linkable unit, a hole transport unit, an electron transport unit, an emissive unit, hydrogen, a halogen atom, a $C_1$-$C_{20}$ alkyl group, and a $C_6$-$C_{30}$ aryl group, and at least one of $R_1$ and $R_2$ is —$CH_2(CH_2)_m$ $SiX_1X_2X_3$, —O—$SiX_4X_5X_6$, or a cross-linkable unit;

each of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, and $X_{20}$ is independently selected from the group consisting of a cross-linkable unit, a hole transport unit, an electron transport unit, an emissive unit, hydrogen, and a $C_1$-$C_{20}$ alkyl group, and at least one of $X_1$, $X_2$, and $X_3$, at least one of $X_4$, $X_5$, and $X_6$, at least one of $X_7$, $X_8$, $X_9$, $X_{10}$, $X_{11}$, $X_{12}$, $X_{13}$, and $X_{14}$, and at least one of $X_{15}$, $X_{16}$, $X_{17}$, $X_{18}$, $X_{19}$, and $X_{20}$ are a cross-linkable unit;

D is a $C_1$-$C_{20}$ alkylene group, a $C_1$-$C_{20}$ alkylene group substituted with at least one halogen atom, a $C_1$-$C_{20}$ alkylene group substituted with at least one hole transport unit, electron transport unit or emissive unit, or a divalent hole transport unit;

p is an integer from 3 to 8;

m is an integer from 1 to 10;

q is zero or an integer from 1 to 10;

r is zero or an integer from 1 to 10;

q $X_{10}$ are the same or different;

q $X_{11}$ are the same or different; and r D are the same or different; and the cross-linkable unit in the siloxane compound of formula (2) is one of a hydroxyl group, a $C_1$-$C_{20}$ alkoxy group, and a halogen atom; and at least one selected from the group consisting of an acid, metal nanoparticles and inorganic nanoparticles.

2. The conducting polymer composition of claim 1, wherein the cross-linkable unit is one of a hydroxyl group, a $C_1$-$C_{20}$ alkoxy group, and a halogen atom.

3. The conducting polymer composition of claim 1, wherein said at least one compound includes at least one hole-transport unit, and the hole transport unit is selected from the group consisting of

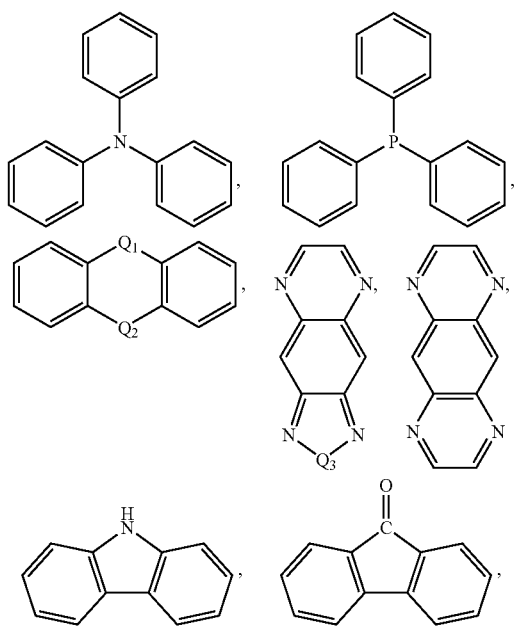

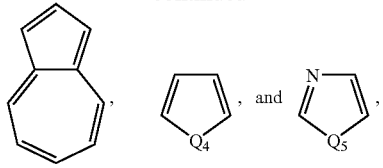

where each of $Q_1$, $Q_2$, $Q_3$, $Q_4$, and $Q_5$ is independently N, O, or S.

4. The conducting polymer composition of claim 1, wherein said at least one compound includes the electron transport unit, and the electron transport unit is selected from the group consisting of

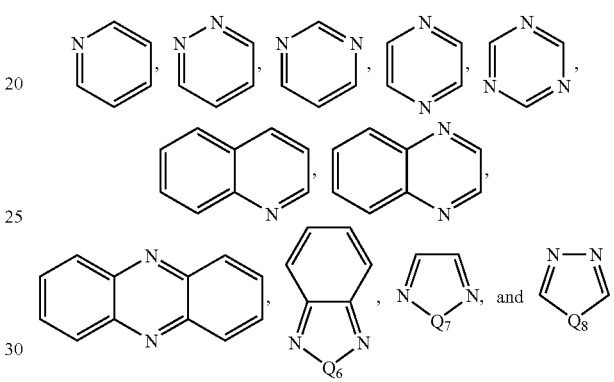

where each of $Q_6$, $Q_7$ and $Q_8$ is independently N, O, or S.

5. The conducting polymer composition of claim 1, wherein said at least one compound includes the emissive unit, and the emissive unit is a $C_6$-$C_{30}$ aromatic cyclic system or a $C_5$-$C_{30}$ hetero aromatic cyclic system.

6. The conducting polymer composition of claim 1, wherein said at least one compound includes the siloxane compound of formula (1), and the siloxane compound of formula (1) is represented by one of formulae (1a), (1b), (1c), (1d), (1e), (1f), and (1g):

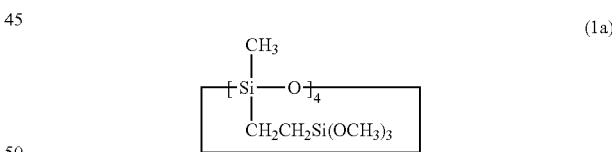
(1a)

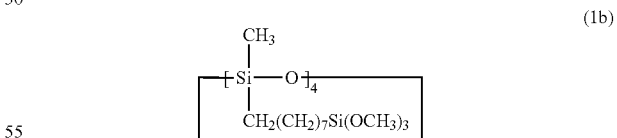
(1b)

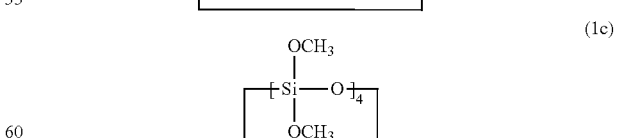
(1c)

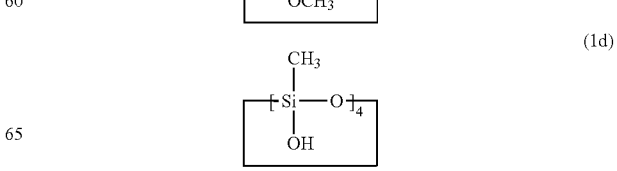
(1d)

(1e)
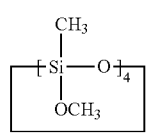
(1f)
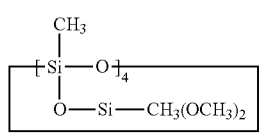
(1g)
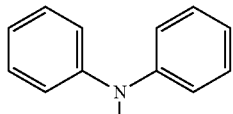
7. The conducting polymer composition of claim 1, wherein the siloxane compound of formula (2) is represented by one of formulae (2a), (2b), (2c), and (2d):
(2a)
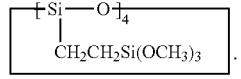
(2b)
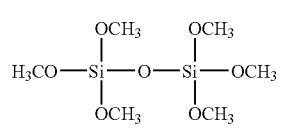
(2c)
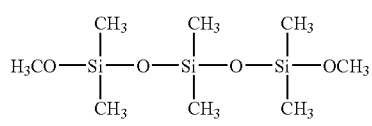
(2d)
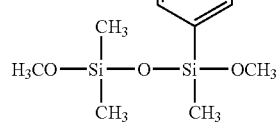
8. The conducting polymer composition of claim 1, wherein the silane compound of formula (3) is represented by one of formulae (3a), (3b), (3c), and (3d):
(3a)
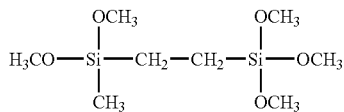
(3b)
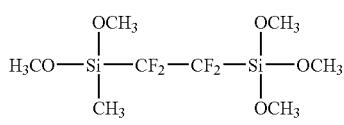
(3c)
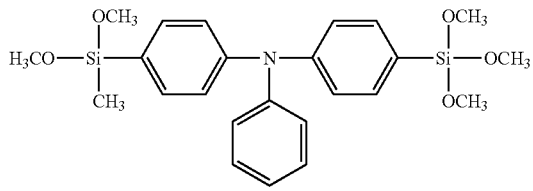
(3d)
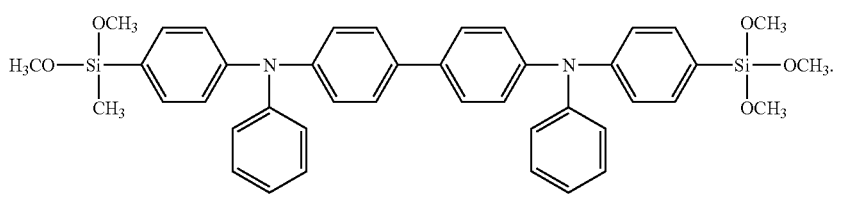

9. The conducting polymer composition of claim 1, wherein the conducting polymer is selected from the group consisting of polythiophene, polyaniline, polypyrrole, polyacetylene, polyvinylenephenylene, polyphenylene, polyfluorene, poly(ethylenedioxythiophene), poly(arylamine), and a derivative thereof, etc.

10. The conducting polymer composition of claim 1, wherein said at least one compound selected from the group consisting of the siloxane compound of formula (1), the siloxane compound of formula (2), and the silane compound of formula (3), and the conducting polymer are contained in a weight ratio of 0.01:99.9 to 20:80.

11. The conducting polymer composition of claim 1, further comprising an acid.

12. The conducting polymer composition of claim 11, wherein the acid include at least one of an atom selected from the group consisting of C, S, N, O, Si, F, Cl, and H; and a functional group selected from the group consisting of a hydroxyl group, a $C_1$-$C_{20}$ alkyl group, a $C_1$-$C_{20}$ alkoxy group, a halogen atom, a cyano group, a nitro group, a $C_6$-$C_{30}$ aryl group, a $C_1$-$C_{20}$ alkylamino group, a $C_6$-$C_{30}$ aryloxy group, a $C_6$-$C_{30}$ arylamino group, a $C_1$-$C_{20}$ alkyl epoxy group, a vinyl group, a $C_1$-$C_{20}$ alkylmercapto, an acetoxy group, a thiol group, and an imide group.

13. The conducting polymer composition of claim 11, wherein the acid includes organic ions selected from the group consisting of sulfonic acid, phosphonic acid, and carboxylic acid, and counter ions selected from the group consisting of H and alkali metal ions.

14. The conducting polymer composition of claim 1, further comprising a crosslinking agent.

15. The conducting polymer composition of claim 1, further comprising at least one of metal nanoparticles and inorganic nanoparticles.

16. An electronic device comprising a layer obtained from the conducting polymer composition of claim 1.

17. The electronic device of claim 16, being an organic light-emitting device.

18. The electronic device of claim 17, wherein the layer is a hole injecting layer or a hole transporting layer.

19. The electronic device of claim 16, being one of a photovoltaic device, an electrochromic device, an electrophoretic device, an organic thin film transistor, and an organic memory device.

20. A conducting polymer composition, comprising:
a conducting polymer; and
at least one compound selected from the group consisting of siloxane compounds of formulae (1), (2a), (2c) and (2d) and silane compounds of formulae (3a), (3b), (3c), and (3d):

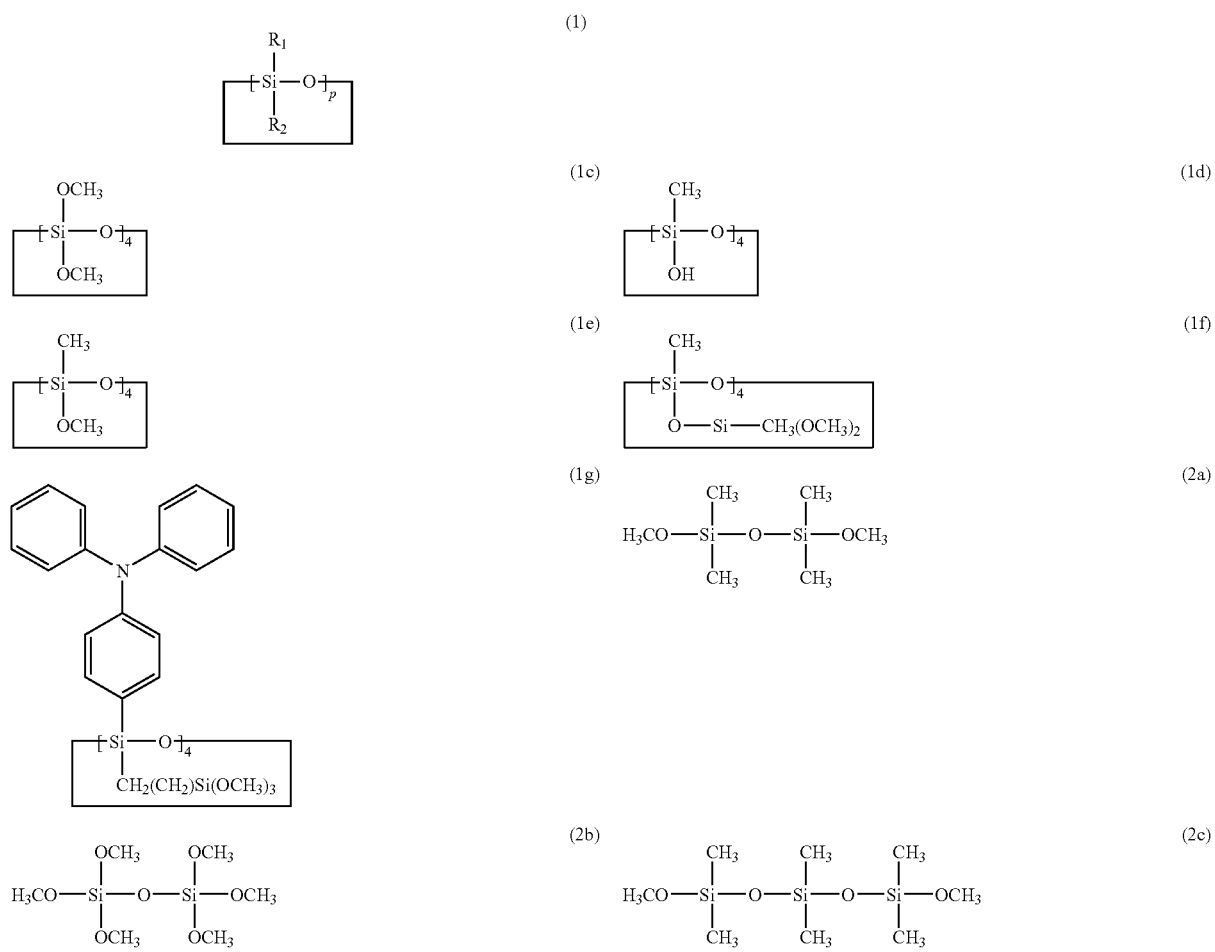

-continued

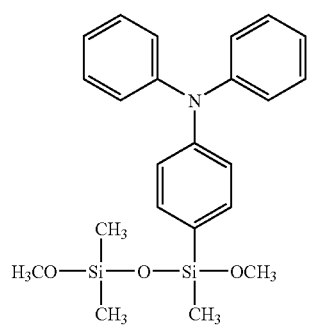
(2d)

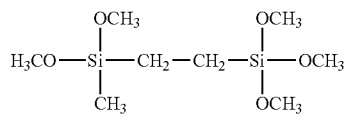
(3a)

where each of $R_1$ and $R_2$ is independently selected from the group consisting of —$CH_2(CH_2)_m SiX_1X_2X_3$, p is an integer from 3 to 8;
m is an integer from 1 to 10;

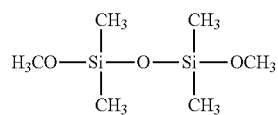
(2a)

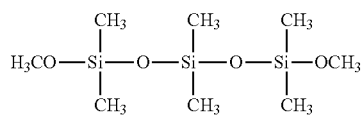
(2c)

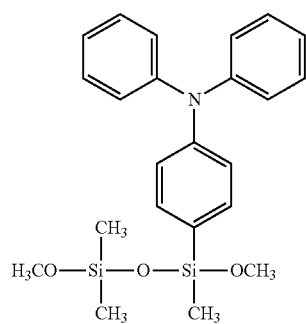
(2d)

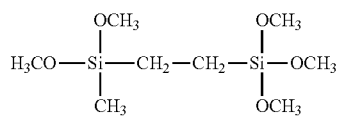
(3a)

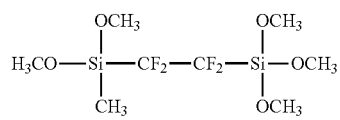
(3b)

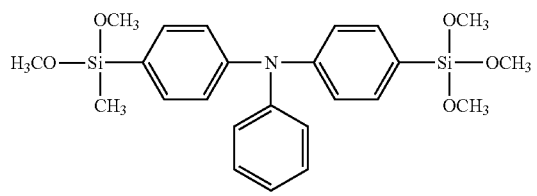
(3c)

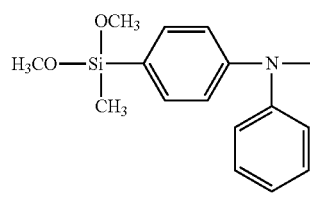
(3d)

—O—$SiX_4X_5X_6$, a cross-linkable unit, a hole transport unit, an electron transport unit, an emissive unit, hydrogen, a halogen atom, a $C_1$-$C_{20}$ alkyl group, and a $C_6$-$C_{30}$ aryl group, and at least one of $R_1$ and $R_2$ is —$CH_2(CH_2)_m SiX_1X_2X_3$, —O—$SiX_4X_5X_6$, or a cross-linkable unit;

each of $X_1$, $X_2$, $X_3$, $X_4$, $X_5$ and $X_6$, is independently selected from the group consisting of a cross-linkable unit, a hole transport unit, an electron transport unit, an emissive unit, hydrogen, and a $C_1$-$C_{20}$ alkyl group, and at least one of $X_1$, $X_2$, and $X_3$ and at least one of $X_4$, $X_5$, and $X_6$, are a cross-linkable unit;

21. The conducting polymer composition of claim 20, wherein said at least one compound and the conducting polymer are contained in a weight ratio of 0.01:99.9-20:80.

22. A conducting polymer composition comprising:
a conducting polymer; and
at least one compound selected from the group consisting of a siloxane compound of formula (1), a siloxane compound of formula (2), and a silane compound of formula (3):

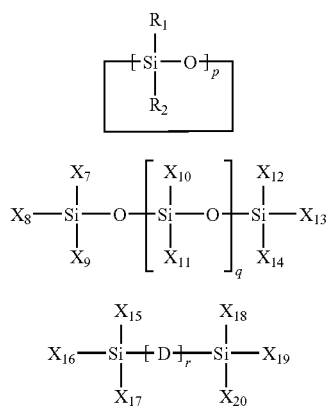

(1)

(2)

(3)

where each of $R_1$ and $R_2$ is independently selected from the group consisting of $-CH_2(CH_2)_m SiX_1 X_2 X_3$, $-O-SiX_4 X_5 X_6$, a cross-linkable unit, a hole transport unit, an electron transport unit, an emissive unit, hydrogen, a halogen atom, a $C_1$-$C_{20}$ alkyl group, and a $C_6$-$C_{30}$ aryl group, and at least one of $R_1$ and $R_2$ is $-CH_2(CH_2)_m SiX_1 X_2 X_3$, $-O-SiX_4 X_5 X_6$, or a cross-linkable unit;

each of $X_1$, $X_2$, $X_3$, $X_4$, $X_5$, $X_6$, $X_7$, $X_8$, $X_9$, $X_{10}$, $X_{11}$, $X_{12}$, $X_{13}$, $X_{14}$, $X_{15}$, $X_{16}$, $X_{17}$, $X_{18}$, $X_{19}$, and $X_{20}$ is independently selected from the group consisting of a cross-linkable unit, a hole transport unit, an electron transport unit, an emissive unit, hydrogen, and a $C_1$-$C_{20}$ alkyl group, and at least one of $X_1$, $X_2$, and $X_3$, at least one of $X_4$, $X_5$, and $X_6$, at least one of $X_7$, $X_8$, $X_9$, $X_{10}$, $X_{11}$, $X_{12}$, $X_{13}$, and $X_{14}$, and at least one of $X_{15}$, $X_{16}$, $X_{17}$, $X_{18}$, $X_{19}$, and $X_{20}$ are a cross-linkable unit;

D is a $C_1$-$C_{20}$ alkylene group, a $C_1$-$C_{20}$ alkylene group substituted with at least one halogen atom, a $C_1$-$C_{20}$ alkylene group substituted with at least one hole transport unit, electron transport unit or emissive unit, or a divalent hole transport unit;

p is an integer from 3 to 8;
m is an integer from 1 to 10;
q is zero or an integer from 1 to 10;
r is zero or an integer from 1 to 10;
q $X_{10}$ are the same or different;
q $X_{11}$ are the same or different; and
r D are the same or different; and
the cross-linkable unit in the siloxane compound of formula (2) is one of a hydroxyl group, a $C_1$-$C_{20}$ alkoxy group, and a halogen atom; and wherein said at least one compound includes at least one of the electron transport unit and the emissive unit;

when said at least one compound includes the electron transport unit, the electron transport unit is selected from the group consisting of

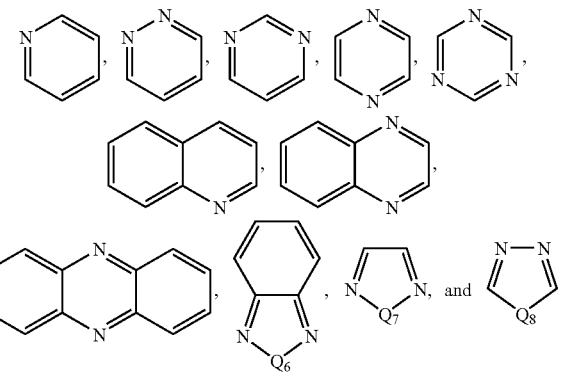

where each of $Q_6$, $Q_7$ and $Q_8$ is independently N, O, or S; and when said at least one compound includes the emissive unit, the emissive unit is a $C_6$-$C_{30}$ aromatic cyclic system or a $C_5$-$C_{30}$ hetero aromatic cyclic system.

23. An organic light-emitting device, comprising:
a first electrode;
a second electrode;
an emitting layer interposed between the first electrode and the second electrode; and
at least one of a hole transporting layer and a hole injecting layer interposed between the emitting layer and the first electrode, said at least one of the hole transporting layer and the hole injecting layer obtained from the conducting polymer composition of claim 22.

24. An organic light-emitting device, comprising:
a first electrode;
a second electrode;
an emitting layer interposed between the first electrode and the second electrode; and
at least one of a hole transporting layer and a hole injecting layer interposed between the emitting layer and the first electrode, said at least one of the hole transporting layer and the hole injecting layer obtained from the conducting polymer composition of claim 20.

* * * * *